United States Patent
Malfait et al.

(10) Patent No.: US 10,873,730 B2
(45) Date of Patent: Dec. 22, 2020

(54) COOLING SYSTEM FOR SPATIAL LIGHT MODULATING DEVICES

(71) Applicant: BARCO N.V., Kortrijk (BE)

(72) Inventors: Bart Cecile Pieter Malfait, Lendelede (BE); Simon Cleenewerck-De-Crayencour, Hansbeke (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 16/472,392

(22) PCT Filed: Dec. 19, 2017

(86) PCT No.: PCT/EP2017/083637
§ 371 (c)(1),
(2) Date: Jun. 21, 2019

(87) PCT Pub. No.: WO2018/115007
PCT Pub. Date: Jun. 28, 2018

(65) Prior Publication Data
US 2019/0364250 A1 Nov. 28, 2019

(30) Foreign Application Priority Data

Dec. 23, 2016 (GB) .................................. 1622220.0

(51) Int. Cl.
*H04N 9/31* (2006.01)
*G02B 7/00* (2006.01)
(Continued)

(52) U.S. Cl.
CPC ........... *H04N 9/3144* (2013.01); *G02B 7/008* (2013.01); *G03B 21/005* (2013.01); *G03B 21/16* (2013.01);
(Continued)

(58) Field of Classification Search
CPC .... G03B 21/006; G03B 21/008; G03B 21/16; G03B 21/147; H04N 9/315; H04N 9/3158;
(Continued)

(56) References Cited

U.S. PATENT DOCUMENTS 5,331,454 A   7/1994 Hornbeck
6,300,294 B1  10/2001 Robbins et al.
(Continued)

FOREIGN PATENT DOCUMENTS

EP           2506573 A2   10/2012

OTHER PUBLICATIONS

International Search Report in corresponding PCT/EP2017/083637, dated Jul. 5, 2018.
(Continued)

*Primary Examiner* — Sultan Chowdhury
(74) *Attorney, Agent, or Firm* — Bacon & Thomas, PLLC

(57) ABSTRACT

A cooling system for controlling the temperature of a light valve of a projection system, the light valve being illuminated by a light source, the cooling system including a first sensor for measuring a first temperature of a first part of the light valve, at least one active heating and/or cooling device to transfer heat between the light valve and a heat source and/or sink, a controller for controlling the temperature of the light valve with the at least one active heating and/or cooling device according to the first temperature with respect to a reference temperature. The cooling system further includes a sensor for determining the amount of light absorbed by the light valve, and where the controller is further configured to control the active heating and/or cooling device based on the amount of light absorbed by the light valve.

19 Claims, 16 Drawing Sheets

(51) Int. Cl.
  *G03B 21/00* (2006.01)
  *G03B 21/16* (2006.01)
  *H04N 5/74* (2006.01)
(52) U.S. Cl.
  CPC ......... *H04N 5/7441* (2013.01); *H04N 9/3194* (2013.01)
(58) Field of Classification Search
  CPC ... H04N 9/3144; H04N 9/3194; H04N 9/3197
  See application file for complete search history.

(56) References Cited

U.S. PATENT DOCUMENTS

| | | | |
|---|---|---|---|
| 6,588,215 | B1 | 7/2003 | Ghoshal |
| 6,751,027 | B2 | 6/2004 | Van Den Bossche et al. |
| 6,804,967 | B2 | 10/2004 | Symko et al. |
| 7,938,543 | B2 | 5/2011 | Gerets et al. |
| 8,436,453 | B2 | 5/2013 | Jacobs et al. |
| 2005/0012905 | A1* | 1/2005 | Morinaga .............. G03B 21/18 353/58 |
| 2005/0030485 | A1 | 2/2005 | Oketani |
| 2008/0024733 | A1 | 1/2008 | Gerets et al. |
| 2009/0046255 | A1 | 2/2009 | Kato |
| 2011/0019160 | A1* | 1/2011 | Kitano ................... G03B 21/16 353/57 |
| 2011/0032488 | A1* | 2/2011 | Abe ....................... G03B 21/14 353/54 |
| 2014/0111777 | A1* | 4/2014 | Miyata ................ H04N 9/3144 353/58 |

OTHER PUBLICATIONS

Partial International Search Report in corresponding PCT/EP2017/083637, dated May 7, 2018.
Written Opinion in corresponding PCT/EP2017/083637, dated Jul. 5, 2018.
Second Written Opinion in corresponding PCT/EP2017/083637, dated Dec. 6, 2018.
International Preliminary Report on Patentability in corresponding PCT/EP2017/083637, dated Mar. 1, 2019.

* cited by examiner

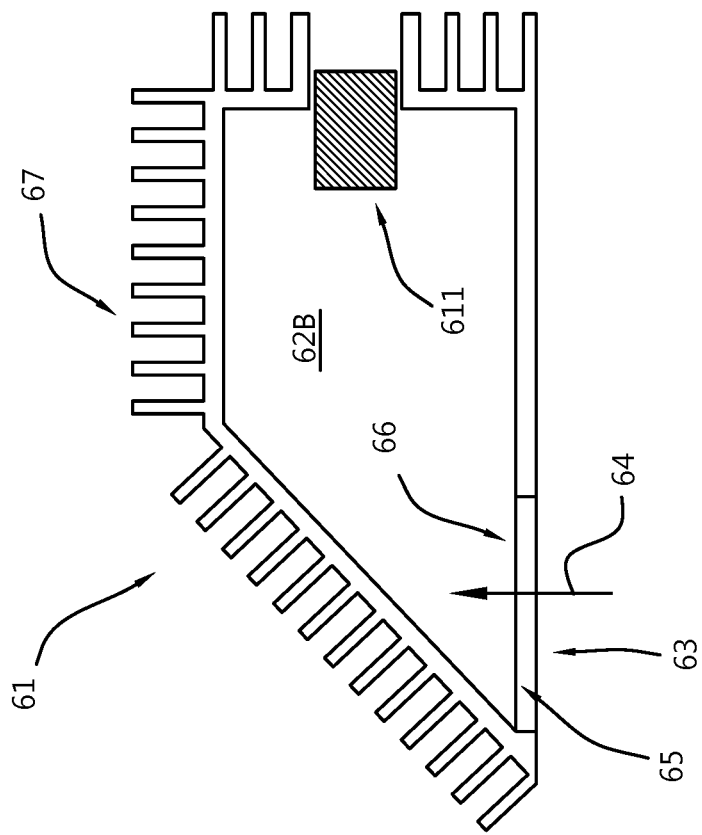
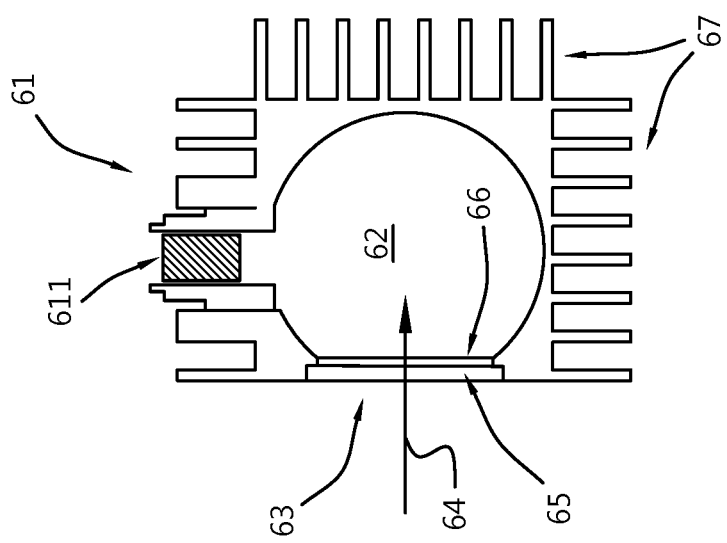

COOLING SYSTEM FOR SPATIAL LIGHT MODULATING DEVICES

TECHNICAL FIELD OF THE INVENTION

The present invention relates to cooling systems for reflective spatial light modulating devices and optical systems comprising such a cooling system as well as to projectors and methods of operating projectors and a controller for controlling such methods, reflective spatial light modulating devices and optical systems and software for carrying out such methods when executed on a processing engine.

BACKGROUND OF THE INVENTION

Image modulating systems, also known as light engines, comprising a housing including spatial light modulating devices or light valves are well known. A spatial light modulating device may function either in a light transmissive mode, such as for LCD light modulators, or it may be a light reflective spatial light modulating device using DMD or LCD, e.g. LCOS, light modulators.

Image modulating systems comprising reflective spatial light modulating devices based on mirrors may suffer less from heat generation than other schemes. However, heat is generated by both the electrical circuits and components, usually located at the back of the reflective spatial light modulating device, and also the incident light which can provide thermal energy in the form of light mainly to the front side of the spatial light modulating device. Some of the light is absorbed by the reflective spatial light modulating device on the front side as well as some on the back side and in the reflective elements.

Many attempts to dissipate or drain the heat away from a reflective spatial light modulating device have been made. As an example in U.S. Pat. No. 6,751,027B2, the heat is drained from the backside of the reflective spatial light modulating device by means of a thermally conductive stud. This stud contacts the backside of the reflective spatial light modulating device.

One possible alternative is to drain the heat away from the backside of a spatial light modulating device via a thermal path using thermal conductivity of several elements, whereas the front side of the device is provided with cooling air, to cool the front side using convective cooling.

In U.S. Pat. No. 7,938,543 the temperature of both front side and backside of a digital micro-mirror device can be controlled. In accordance with some embodiments, the temperature of both front side and backside of reflective spatial light modulating devices, and thus, optionally, the temperature differences over front and backside of the reflective spatial light modulating device, may be controlled jointly and/or independently one from the other.

Unfortunately, with the ever-higher lumen output required, the cooling system proposed in U.S. Pat. No. 7,938,543 does not always perform as expected. In particular, overshoots of the controlled temperatures can be observed which cause premature degradation of the light valves and of the active heat transfer devices.

There is a need for improvement in the art.

SUMMARY OF THE INVENTION

It is a purpose of the invention to provide better apparatus and methods to control the temperature of a light valve or spatial light modulator in a projector. The light valve or spatial light modulator is illuminated by one or more light sources and redirects the light to either a projection lens to be projected on a screen where it will form an image or to a light dump where it will be absorbed.

In embodiments of the present invention the temperature of the light valve or spatial light modulator is controlled by a control system comprising at least one effector to transfer heat between the light valve or spatial light modulator and a heat source and/or sink, a first sensor to measure the temperature of the light valve or spatial light modulator, a second sensor to measure the amount of light directed by the light valve or spatial light modulator to a light dump or to the projection optics and a controller to drive the effector based on the measurements taken by the first and the second sensor.

Thus, it is an object of embodiments of the present invention to provide a cooling system for controlling the temperature of a light valve or spatial light modulator of a projection system, said light valve or spatial light modulator being illuminated by a light source, the cooling system comprising a first sensor for measuring a first temperature of a first part of the light valve or spatial light modulator, at least one active heating and/or cooling device to transfer heat between the light valve or spatial light modulator and a heat source and/or sink, a controller for controlling the temperature of the light valve or spatial light modulator with the at least one active heating and/or cooling device according to the first temperature with respect to a reference temperature, characterized in that the cooling system further comprises means for determining the amount of light absorbed by the light valve or spatial light modulator, and wherein the controller is further configured to control the active heating and/or cooling device based on the amount of light absorbed by the light valve.

Said cooling system can be retrofitted on existing projectors.

It is an advantage of the invention that better control of the temperature of the light valve or spatial light modulator is possible by evaluating and taking into account the radiative heat transfer between a light source of the projector (incident on the light valve) and the light valve or spatial light modulator. For instance, all other things being kept equal, a change in radiative heat transfer between the light valve or spatial light modulator and the light source is followed by a change in the temperature of the light valve or spatial light modulator. Monitoring the radiative heat transfer allows one to anticipate the change in temperature and to avoid or at least mitigate overshoots and undershoots of temperature. By anticipating temperature changes, the controller can drive the at least one effector less intensively and thereby extend the lifetime or time before failure of the effector. The radiative heat transfer between the light source and the light valve or spatial light modulator being a function of the configuration of the light valve elements (e.g. the position of micro-mirrors if the light valve or spatial light modulator is a micro-mirror device or DMD), measuring the amount of light that is reflected towards the projection optics or to the light dump gives information on the configuration of the light valve or spatial light modulator and thus the rate at which heat transfer is done between the light source and the light valve. Knowing the rate at which the light valve or spatial light modulator is heated by the light source can be used to modify the temperature control algorithm on the fly (adaptive control for a time varying process).

Measuring the amount of light reflected towards the projection optics and/or towards the light dump can also be used to evaluate the maximum amount of light which will illuminate the light valve or spatial light modulator (based, for instance, on a measurement made when the light valve or spatial light modulator is configured to reflect all the light towards either the projection optics or the light dump) during normal use. That information can be used for a self-tuning controller. The control system will determine, e.g. during a power-up sequence, the best parameters to use for controlling the temperature of the light valve or spatial light modulator.

The second sensor or the means for determining the amount of light absorbed by the light valve can be a "software sensor" that analyzes the image data that drives the light valve or spatial light modulator to determine how much light is reflected towards the projection optics and how much light is reflected towards the light dump. As explained previously, knowing the state of the light valve or spatial light modulator gives information on the heat transfer between the light source and the light valve or spatial light modulator.

Advantageously, the means for determining the amount of light absorbed by the light valve or spatial light modulator can comprise a software which analyzes the content of images projected onto the light valve or spatial light modulator and to evaluate the amount of light illuminating the light valve or spatial light modulator that will be absorbed by the light valve or spatial light modulator.

Preferably, the software can comprise a digital filter which computes an average position for the micro-mirrors and outputs an estimated radiative heat transfer between the light source and the light valve or spatial light modulator, which estimated radiative heat transfer is used to determine the amount of light absorbed by the light valve or spatial light modulator.

Using software for determining the amount of light absorbed by the light valve or spatial light modulator has the advantage that this can easily be retrofitted to existing projectors as the state of the mirrors can be derived from the content of the images. No hardware needs to be implemented inside the projector for measuring the amount of light absorbed by the light valve or spatial light modulator, only the cooling means need to be provided to the projector. Also, the software can be very accurate and the amount of light absorbed can be anticipated well in advance. An additional processor may be provided to analyze the content of the images, or this can also be deduced from the control signal sent to the light valve, for controlling the position of the micro-mirrors for example.

However, accessing the image data that drives the light valve or spatial light modulator is not always possible; for instance, in digital cinema, the image data may not be accessed for any other purposes than forming an image. Therefore, in another embodiment of the invention, the second sensor can be a sensor that measures the amount of light reflected towards the light dump.

It is an advantage of that aspect of the invention that the sensor is not positioned between the light source and the light valve or spatial light modulator and does not affect the uniformity of the light distribution on the light valve or spatial light modulator.

The second sensor can be a photo-sensor like a photo-diode or a phototransistor

Such a sensor directed at the screen on which images are projected can be used to evaluate the white content (i.e. the number of micro-mirrors reflecting light towards the projection optics) but it is also subject to e.g. reflection on the walls, the window separating the audience and projection screen from the projection room etc.

Alternatively, the state of the micro-mirror devices can be determined by evaluating the light reaching the light dump with a photo-sensor like a photodiode or phototransistor. When the light dump is used to evaluate the level of white in images being projected, an integrator can be used. The geometry of the light dump is modified to optimize the responsivity or gain of the second sensor without compromising the main function of the light dump which is to absorb light not projected on the screen.

Advantageously, the photo-sensor can be configured to measure at least two properties of light such as the wavelength or color and intensity. In fact, the properties of light also affect the radiative transfer between the light valve and the light source.

More preferably, the second sensor can comprise a light integrator, the light integrator having an opening to let at least part of the light not redirected towards the projection optics enter the light integrator and wherein the second sensor measures light integrated by the light integrator.

Advantageously, the second sensor can comprise a temperature sensor.

The sensor that evaluates the amount of light reaching the light dump can also be a temperature sensor to measure the temperature of the light dump. Indeed, the temperature of the light dump is a function of the amount of light redirected towards the light dump and absorbed by it. The light dump having a thermal inertia it will average the variations in the amount of light reaching the light dump.

Preferably, the measured amount of light absorbed by the light valve can be used for gain scheduling, for feedforward control, for adjusting the parameters of a PID controller.

Advantageously, a third sensor can measure a second temperature at a second part of the light valve or spatial light modulator and a second active heating and/or cooling device is configured to transfer heat between the second part of the light valve or spatial light modulator and a heat source and/or sink.

It is important to reduce the temperature gradient within a light valve or spatial light modulator, and the present invention provides means to reduce such a gradient. Thus, the temperature of the array of the light valve or spatial light modulator can be more accurately controlled thanks to embodiments of the present invention and can be maintained in a range of safe operation.

Preferably, the first sensor is placed in the back of the light valve or spatial light modulator and the third sensor is placed in the front of the light valve or spatial light modulator.

This arrangement of the sensors enables to control the gradient of temperatures between the front and the back of the light valve or spatial light modulator. However, from the temperature at the back, the temperature of the array can be computed. Thus, using a thermal model, the temperature at various locations of the light valve or spatial light modulator can be evaluated and the control can be adapted to such temperatures.

More preferably, the cooling system can comprise a second controller for controlling the second active heating and/or cooling device using the measurements of the third sensor and of the determined amount of light absorbed by the light valve or spatial light modulator in order to control the temperature at the second part of the light valve or spatial light modulator.

It is important to be able to adapt the control of the temperature at the front of the light valve and at the back of the light valve or spatial light modulator independently.

Advantageously, the second controller can be used to reduce the temperature difference between the temperature of the light valve array or spatial light modulator array and of the front temperature around the light valve or spatial light modulator.

Preferably, the light valve can be an LC panel, an LCOS or a Digital Micro Mirror Device, or an LCoS phase modulator used for beam steering.

In a further aspect of the invention, a third sensor can thus be used to measure a gradient of temperature across the light valve or spatial light modulator. The third sensor is for instance a temperature sensor measuring the temperature of the light valve at another position of the light valve than the first sensor. The controller drives the effector based on the measurements taken by the first, the second and the third sensor.

In a further aspect of the invention, the heat dump is used as a heat source/heat sink for the light valve or spatial light modulator. It is an advantage of that aspect of the invention that it will help to mitigate sudden temperature fluctuations of the light valve or spatial light modulator. The response time of the temperature control system being finite, each variation of the radiative transfer between the light source and the light valve or spatial light modulator may cause the temperature of the light valve or spatial light modulator or a gradient of temperature across the light valve or spatial light modulator to exceed, even if only temporarily, a maximum threshold beyond which the light valve or spatial light modulator can degrade. Slowing down temperature variations caused by a change in radiative transfer can thus help the control system to keep the temperature of the light valve or spatial light modulator and/or the gradient of temperature across the light valve or spatial light modulator within predetermined limits. Using the light dump as a heat source/heat sink will also help with energy conservation. Indeed, instead of activating e.g. a heater resistor or a Peltier element to heat-up or cool-down the light valve or spatial light modulator, one can save energy by letting heat flow from the light valve or spatial light modulator to the heat dump or from the heat dump to the light valve or spatial light modulator.

In one embodiment of that aspect of the invention, a mere thermal bridge (like e.g. a block of copper between the light valve or spatial light modulator and the light dump) can be established between the heat dump and the light valve or spatial light modulator. The thermal inertia of the whole (light valve or spatial light modulator and light dump together) is higher than the thermal inertia of its parts (light valve or spatial light modulator on the one hand and light dump on the other hand) which can help in stabilizing the temperature of (a part) of the light valve or spatial light modulator (e.g. limit overshoots)

In another embodiment of that aspect of the invention, the thermal bridge between the light valve or spatial light modulator and the heat dump can be made by means of e.g. a heat pipe.

In a further aspect of the invention, the temperature control of a light valve or spatial light modulator is done independently of the temperature control of other light valves or spatial light modulators in the same projector.

It is an advantage of that aspect of the invention that the control will be more efficient and will reduce the thermal gradient across the light valve or spatial light modulator. When a light valve or spatial light modulator is used to project a single color like e.g. red, green or blue, the optical power arriving on the light valve or spatial light modulator is not the same for each of the light valves or spatial light modulators.

Furthermore, each of the control loops can use different heat transfer devices in function of the color of the light illuminating the light valve or spatial light modulator.

In yet another aspect of the invention, the cooling system can comprise a fourth sensor which measures the temperature in a fluid filling part or all of the optical system.

Advantageously, the controller can be a self-tuning controller and wherein the self-tuning can be done in function of at least one measurement made with the second sensor and/or the fourth sensor.

Preferably, the controller can comprise at least one of a fuzzy regulator, a neural network, is digital or analog, is a PID controller.

More advantageously, the controller can be an adaptive controller and wherein the adaptive controller is tuned in function of at least one measurement made with the second sensor and/or the fourth sensor.

Advantageously, the reference temperature can be a function of at least one measurement made with the second sensor.

In another aspect of the present invention, the active heating and/or cooling device can comprise at least one of a heat sink or metal stud for radiating heat collected at the light valve, and at least one of a fan for cooling said heat sink, a Peltier element for cooling said heat sink.

Preferably, a thermal grease or paste can be used to improve the transfer of heat from the light valve or spatial light modulator to the metal stud or heat sink.

Advantageously, the metal stud or heat sink can be cooled by a liquid circulating through heat exchangers.

More preferably, heat can be evacuated from the front side of a light valve or spatial light modulator by heat pipes, wherein the heat evacuated by a heat pipe can be transferred to a liquid coolant by means of a heat exchanger or is transferred to a gas circulated through a finned heat sink, or can be transferred to a gas by means of a heat exchanger.

It is another object of the present invention to provide a projector comprising the cooling system described above.

Advantageously, the light valve or spatial light modulator can be at least one of an LC panel, an LCOS or a Digital Micro Mirror Device, or an LCoS phase modulator used for beam steering.

It is another object of the present invention to provide a multi-chip projector, wherein a separate cooling system is provided for each chip.

It is an advantage that each light valve or spatial light modulator, being subject to a different type of illumination, requires a different cooling. The present invention solves this problem by providing a cooling system adapted to each type (spectral and illumination power) of illumination of a multi-chip projector, and thereby to avoid failure of such a projector. In fact, each light valve or spatial light modulator will have a different temperature, and it is of major importance to adapt the cooling to each light valve or spatial light modulator.

Advantageously, the light valve or spatial light modulator can be at least one of an LC panel, an LCOS or a Digital Micro Mirror Device, or an LCoS phase modulator used for beam steering.

In this embodiment, the projector can be a 6P projector (6 primary color projector).

It is a further aspect of the present invention to provide a method of controlling the temperature of a light valve or spatial light modulator with a first cooling system comprising a first active heating and/or cooling device, said method comprising the steps of measuring a first temperature of the light valve or spatial light modulator with a first sensor, comparing said first temperature with a reference temperature, getting a second signal provided by means for determining the amount of light absorbed by the light valve, driving the first active heating and/or cooling device as a function of the second signal and the comparison of said first temperature and said reference temperature.

Advantageously, the temperature of the light valve or spatial light modulator can be controlled by a cooling system comprising a second active heating and/or cooling device and further comprising the steps of measuring a second temperature of the light valve with a second sensor, comparing said second temperature with a second reference temperature, driving the second active heating and/or cooling device as a function of the second signal and the comparison of said second temperature and said second reference temperature.

Preferably, the method can further comprise the steps of using a thermal model to define said first and second reference temperatures based on the value of the second signal.

It is another aspect of the present invention to provide a first controller for controlling the temperature of the light valve or spatial light modulator with the cooling system described above, and with at least one first active heating and/or cooling device according to a first temperature with respect to a first reference temperature, and according to the amount of light absorbed by the light valve or spatial light modulator.

It is another aspect of the present invention to provide a second controller for controlling the temperature of the light valve or spatial light modulator with the cooling system described above, with at least one second active heating and/or cooling device according to a second temperature with respect to a second reference temperature, and according to the amount of light absorbed by the light valve or spatial light modulator.

In another aspect the present invention provides software for executing any of the method steps of the present invention when the software is executed on a processing engine such as a microprocessor, processor, microcontroller, or central processing unit (CPU) and/or a Graphics Processing Unit (GPU), e.g. located in the controller.

In another aspect the present invention comprises the software stored on a non-transitory signal storage medium.

BRIEF DESCRIPTION OF THE DRAWINGS

FIGS. 6A and 6B give example of a light dump according to an aspect of the invention.

DEFINITIONS

Figure 1:
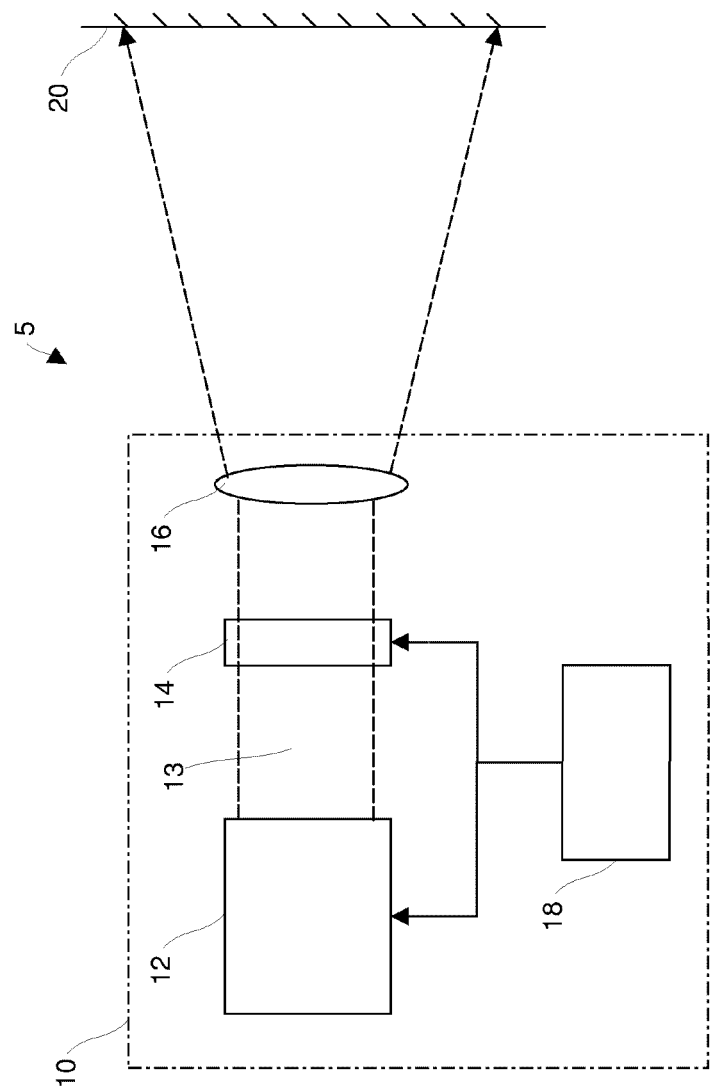
FIG. 1 shows a schematic representation of a digital projector.

The following terms are provided solely to aid in the understanding of the invention. These definitions should not be construed to have a scope less than understood by a person of ordinary skill in the art.

Black Box Model. In science, computing, and engineering, a black box is a device, system or object which can be viewed in terms of its inputs and outputs (or transfer characteristics), without any knowledge of its internal workings. Its implementation is "opaque" (black). Almost anything might be referred to as a black box: a transistor, an algorithm, or the human brain.

Dimming (of the light source). Reduction of the amount of light incident on a light valve. This can be done e.g. by means of an iris positioned between the light source (12 on FIG. 1) and the light valve (14 on FIG. 1). If the light source is composed of one or more Light Emitting Diodes or (semiconductor) Lasers. Dimming can also be induced by reducing the current to the lasers/lamp/LED or shutting down some lasers (which is not preferred due to speckles). There are also other mechanical ways to reduce the aperture and doing so reducing the amount of light: two straight plates moving closer/further away, a scissor like device where the scissors are curved (making approximately a round opening).

DMD. Or Digital MicroMirror Device; an example of light valve or spatial light modulator.

Gain Scheduling. In control theory, gain scheduling is an approach for the control of non-permanent/nonlinear systems that uses a family of linear controllers, each of which provides satisfactory control for a different operating point of the system.

One or more observable variables, called the scheduling variables, are used to determine what operating region the system is currently in and to enable the appropriate linear controller. In this application, the scheduling variable is determined by measurements made by the second sensor (e.g. the white level)

Grey Box Model.

Housing. The term "housing for a spatial light modulating device" is to be understood as an assembly for modulating incident light according to digital image information, especially arbitrary digital image information. The housing may include fittings for mounting a light modulator mounted into a package. The package has a front side for facing the incident light, which front side may be provided with a transparent wall such as a glass wall, and a package backside which may comprise electronic components or a connection to electronic components for driving the spatial light modulating device. Two or more heat transporting elements may be provided for cooling the assembly. The assembly may optionally comprise a chemical filter for absorbing e.g. silicon oils or contaminating elements in the space between light modulator and glass wall of the front side.

Light Valve. (Also known as spatial light modulator. In the text and claims the terms light valve and or spatial light modulator are to be considered as synonymous). The spatial light modulator can be a reflective spatial light modulator. The term "reflective spatial light modulator" is to be understood as a spatial light modulator which modulates the light in reflective mode, e.g. using an addressable mirror, a series of mirrors as is found in the form of a rotating polygon or an array of individually addressable mirrors, more particular, mirroring elements being part of the light modulator mounted in the package of the housing.

A reflective spatial light modulating device may comprise different types of reflective light modulators, such as digital mirror device (DMD), a liquid crystal display (LCD) or a liquid crystal on silicon (LCOS). Preferably, the light modulators can be addressed on a pixel-by-pixel basis to thereby represent an arbitrary image of varying greyscale, e.g. video images. The DMD, also called digital mirror device or digital micro-mirror device, is a reflective spatial light modulator, comprising a semiconductor-based array of fast, reflective digital light switches that precisely control reflection of a light source using, for example, a binary pulse width modulation technique. A DMD has a matrix of a plurality of individually addressable and electrically deformable or moveable mirror cells. In a first state or position, each mirror cell of the digital mirror device acts as a plane mirror to reflect the light received to one direction, through a projection lens towards e.g. a projection screen, while in a second state or position they project the light received to another direction, away from the projection screen. In a reflective liquid crystal display (also known as LCOS) light valve, the light is not modulated by a mechanical displacement of a mirror, but by changing the polarization state of the liquid crystals in the light valve.

The light valve or spatial light modulator can also be transmissive. An example of transmissive spatial light modulator is a liquid crystal light valve. At least some embodiments of the present invention apply to transmissive spatial light modulator.

Liquid Loop. A liquid can be used to evacuate heat from a first region of the projector to a second region of the projector. The liquid is usually circulated by means of a pump in a closed loop. Liquid is pumped from a temperature controlled reservoir towards a heat exchanger (typically a metal block) where it absorbs heat before flowing back to the temperature controlled reservoir.

Package. The term "package" is to be understood as a preassembled unit.

Package Front Side. The term "package front side" is to be understood as the side of the package of the spatial light modulating housing which is facing the incident light. This side is also emitting projection light towards the projection optics.

The term "reflective spatial light modulator" is to be understood as a spatial light modulator which modulates the light in reflective mode, e.g. using an addressable mirror, a series of mirrors as is found in the form of a rotating polygon or an array of individually addressable mirrors, more particular, mirroring elements being part of the light modulator mounted in the package of the housing.

PID (regulator). Aka P+I+D regulator. With a PID regulator, the drive signal u(t) with which to drive the heat transfer device is determined by $$u(t) = K_p e(t) + K_i \int_0^t e(t)dt + K_d \frac{de(t)}{dt},$$

where e(t) is the error signal (in the example of e.g. FIG. 5 $T_{DMDSetPoint} - T_{DMD}$) and Kp, Ki and Kd are constants. The equation here above is relevant to an analog or time continuous P+I+D regulator and is given as example only. If the regulator is implemented in a digital processor (microcontroller, microprocessor, computer), one will use the discrete form for u (see e.g. chapter 2 of "Computer Controlled Systems: Theory and Design" by Karl J. Astrom and Bjorn Wittenmark (Prentice Hall International Editions)).

Reflective Spatial Light Modulator or Modulating Device. A reflective spatial light modulating device may comprise different types of reflective light modulators, such as digital mirror device (DMD), or a liquid crystal on silicon (LCOS). Preferably, the light modulators can be addressed on a pixel-by-pixel basis to thereby represent an arbitrary image of varying greyscale, e.g. video images. The DMD, also called digital mirror device or digital micromirror device, is a reflective spatial light modulator, comprising a semiconductor-based array of fast, reflective digital light switches that precisely control reflection of a light source using, for example, a binary pulse width modulation technique. A DMD has a matrix of a plurality of individually addressable and electrically deformable or moveable mirror cells. In a first state or position, each mirror cell of the digital mirror device acts as a plane mirror to reflect the light received to one direction, through a projection lens towards e.g. a projection screen, while in a second state or position they project the light received to another direction, away from the projection screen. In a reflective liquid crystal display (LCD) light valve, the light is not modulated by a mechanical displacement of a mirror, but by changing the polarization state of the liquid crystals in the light valve.

Peltier (element). Also known as Peltier-Seebeck element. A thermos-electric device that can transfer heat from one point to another in function of the direction of the current circulating through it.

Passive Heat Transfer Device. The term "passive cooling device" and more generally "passive heat transfer device" is to be understood as a device whose thermal energy taken from the object to be cooled or heated, cannot be controlled by means of a controlling unit, i.e. it dissipates heat in an open loop manner.

Examples of passive heat transfer devices are e.g. a simple array of cooling fins or a heat pipe.

A heat pipe is a heat-transfer device that combines the principles of both thermal conductivity and phase transition to efficiently manage the transfer of heat between two solid interfaces.

At the hot interface of a heat pipe a liquid in contact with a thermally conductive solid surface turns into a vapor by absorbing heat from that surface. The vapor then travels along the heat pipe to the cold interface and condenses back into a liquid—releasing the latent heat. The liquid then returns to the hot interface through capillary action, centrifugal force, or gravity, and the cycle repeats. Due to the very high heat transfer coefficients for boiling and condensation, heat pipes are highly effective thermal conductors. The effective thermal conductivity varies with heat pipe length, and can approach 100 kW/(m·K) for long heat pipes, in comparison with approximately 0.4 kW/(m·K) for copper and 0.23 kW/(m·K) for aluminum.

Active Heat Transfer Device or Active Heat Transfer Element. (In the text and claims the terms Active heat transfer device, active heat transfer element or effector are to be considered as synonymous). The term "active cooling device" and more generally "active heat transfer device" is to be understood as a device whose thermal energy taken from the object to be cooled, can be controlled by means of a controlling unit. Throughout the application, the term effector can also be used instead of Active Heat Transfer Device. As an example, an active cooling device may be a Peltier element. Any form of micro-cooling device can be used. For example, one type of cooling devices are micro-electro-mechanical refrigeration systems. One example of such a system may be a refrigeration system based on a magnetic refrigeration cycle whereby a micro-electro-mechanical switch, a micro relay, a reed switch or a gate switch may be used for switching between an absorption phase and a heat rejection phase of such a cycle. Such devices are described in more detail in e.g. U.S. Pat. No. 6,588,215 B1 from International Business Machines Corporation. Another example of such a system may be a thermoacoustic refrigerator based on providing a temperature difference across a stack using a piezoelectric driver. Thereby a high frequency sound is generated which, by interaction with one or more parts of the stack creates a temperature gradient, thus allowing cooling, as e.g. described in more detail in U.S. Pat. No. 6,804,967 B2 by University of Utah. Still another example of such a system may be a micro-electro-mechanical system whereby expansion of gas is controlled using a micro-electro-mechanical valve, as described in more detail in U.S. Pat. No. 6,804,967 by Technology Applications, Inc. It is an advantage of several of these cooling means that they can be applied using micro-electro-mechanical technology, lithography or thin film deposition techniques such that integration in the detection system can be performed and that their size is compact.

Control System. In the description and the figures, a control system to control a parameter of a process or system to be controlled comprises at least one of each of the following elements: a controller (e.g. to control a temperature), a sensor (e.g. to measure a temperature) and an effector.

The controller generates a signal for driving an effector or actuator. In this invention, the effector is for instance an active heat transfer device.

The control means may compare a measured temperature like e.g. the temperature from the back- and/or the front side with a preset value (also known as command signal or set point) to generate a signal to drive the effector (e.g. an active heat transfer device) and adjust a heat flow from along the heat transporting means depending upon the difference of measured and preset value.

The control means for controlling the heat flow in at least one of the first and second heat transporting means (or to the first and second heat dissipating means) may comprise a calculating unit to calculate a signal to drive the effector. The calculating unit can be a digital device like e.g. a microprocessor or a microcontroller. The calculating unit can be an analog calculator (like e.g. an analog PID controller as described in e.g. Single Active Element PID Controllers by Michal et al in Radioelektronika, 2010 20th International Conference).

A more detailed description of control systems can be found for instance in "Computer Controlled Systems: Theory and Design" by Karl J. Astrom and Bjorn Wittenmark (Prentice Hall Interntional Editions) or "Schaum's Outline of Feedback and Control Systems"

(to) Measure. To find out the size, length, or amount of (something); to judge the importance, value, or extent of (something).

Sensor. a device that responds to a physical stimulus (as heat, light, sound, pressure, magnetism, or a particular motion) and transmits a resulting impulse (as for measurement or operating a control) In this application, "sensor" will be used to mean the transducer element alone or the transducer element and the associated electronics (like e.g. signal conditioning, amplifications etc.) Example: in the case of a light sensor, the word sensor will apply to the photodiode alone or to the photodiode together with the amplifier to which it is connected.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

FIG. 1 schematically shows a projection system 5 with which the present invention can be used, comprising a projector 10 and a display surface 20 on which an image is formed. The display surface can be a display screen or some other surface such as a face of a building or water. The projector 10 can be any suitable projector. For example, it can comprise a light source apparatus 12, a light modulator 14 and a projection lens assembly 16. The light source apparatus 12 generates a beam 13 of light to illuminate the light modulator 14. The light modulator 14 can be a spatial light modulator or light valve, e.g. it can comprise a two-dimensional array of light modulating elements, also called light valve elements. Each light valve element can correspond to a pixel of the image to be displayed and can be individually controlled to allow an amount of light to pass through/be reflected from that element. In such a spatial light modulator, each light valve element can correspond to more than one pixel of the image to be displayed. For example, the light modulator can be controlled e.g. by oscillating rotation to allow an amount of light to pass through/be reflected from a pixel element towards a first and a second direction, e.g. to project a pixel in one half of an image and in the other half at different times. Typically, each light valve element is controlled across a range of intensity values (e.g. 256) between 'on' and 'off' to provide a range of greyscale values. Such control can include Pulse Width Modulation. The light modulator 14 can use a reflective technology such as Digital Micromirror Devices (DMD) or Liquid Crystal On Silicon (LCOS).

Advantageously, the light beam 13 has an even intensity distribution across the surface of the light modulator 14. The present invention is particularly useful with coherent light beams such as those obtained from lasers. The light source 12 comprises at least one laser light source capable of emitting high-intensity beams of one or more primary colours or a set of laser light sources which are capable of emitting high-intensity beams of one or more primary colours. Certain light sources 12 will be described in detail below. The laser light sources can also be Phosphor based and with blue lasers, the rest of the colors being generated by a yellow phosphor that is excited by blue lasers. The laser light sources can also comprise assisted phosphor it means that they comprise extra red lasers, for a better color rendering (green or yellow phosphor can be used), or full lasers.

The projector also comprises a controller 18 which controls operation of the light source 12 and light modulator 14. The controller may be supplied as a separate component. The projector can comprise three or more sets of the apparatus 10 arranged in parallel—one set for each of the primary colours (e.g. red, green, blue or more), or the same set of apparatus 10 can be used to sequentially emit each of the primary colours, i.e. red, then green, then blue or more. To obtain special effects or to provide extended colour gamuts more primary colours can be used. The number of primary colours may be three, four, five or more.

In embodiments, multi-chip and single chip implementations are provided. In a multi-chip implementation, parts can be common and parts can be per primary. Useful combinations are, for example:

Three or more laser light sources, one integrator, one modulator and the primary colours are projected in time sequence, Three or more laser light sources, three or more integrators, three or more modulators, each modulator having its own cooling system.

Three or more laser light sources, one integrator, three or more modulators each modulator having its own cooling system.

Figure 2:
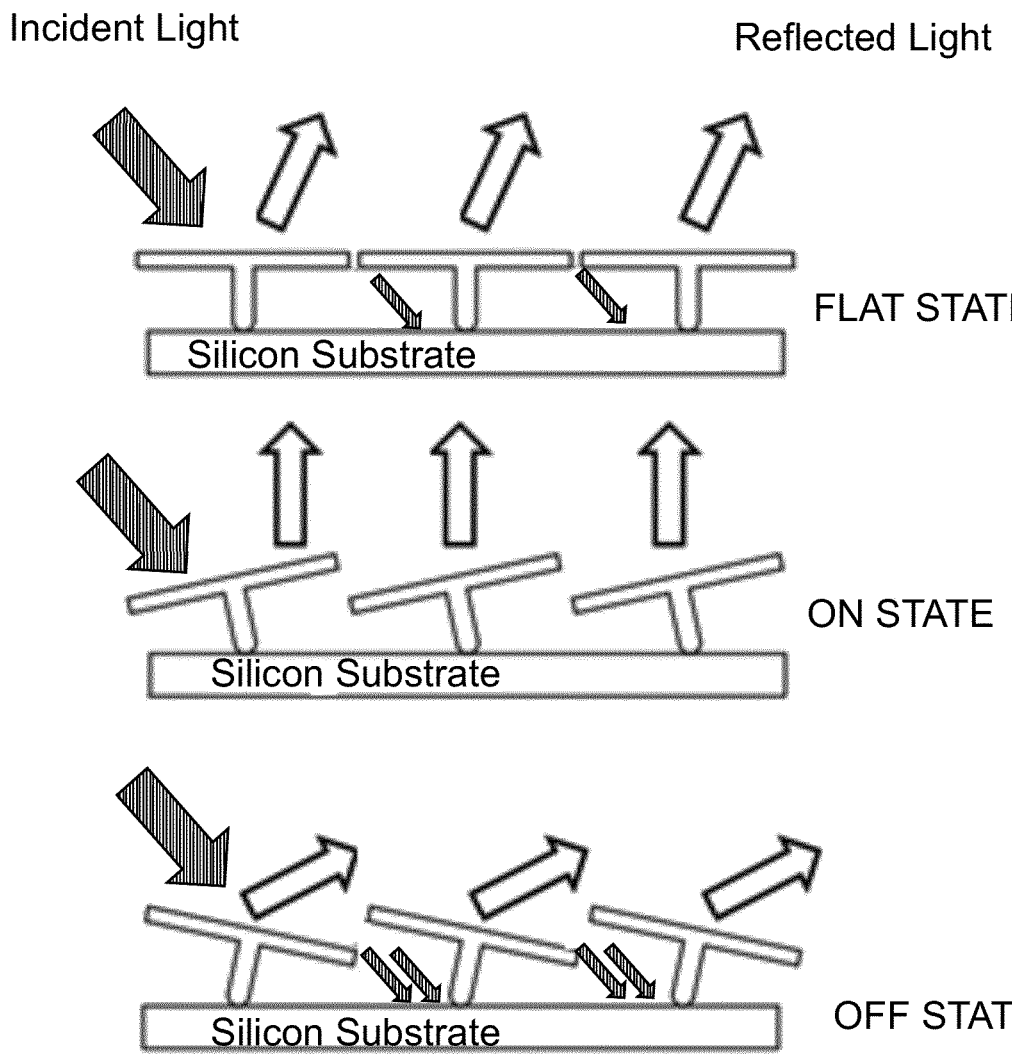
FIG. 2 shows three different states of the micro-mirrors of a DMD.

When the light valve is a DMD, the radiative heat transfer between the light source 12 and the light valve is function of the state of the micro-mirrors as illustrated on FIG. 2.

When a pixel is in the FLAT or in the OFF state, some of the incident light can reach the substrate on which the micro-mirrors stand through the spaces between the micro-mirror in the FLAT or OFF state and the adjacent micro-mirrors.

As illustrated on FIG. 2, more of the incident light can reach (and be absorbed by) the substrate for pixels in the OFF state.

Table 1 shows how the percentage of absorbed heat load evolves in function of the dimensions of the micro-mirrors. The absorbed heat load percentage is the fraction of incoming optical power that is absorbed by the light valve. The percentages are given for a "fully white" and a "fully black". For instance, for a 5.4 μm pixel, 40% of the power of the light incident on the DMD is absorbed by the DMD when all pixels are in the OFF state (i.e. fully black image). For the same pixel, 30% of the incident power is absorbed by the DMD when all pixels are in the ON state (i.e. fully white image).

TABLE 1

| pixel size | Absorbed heat load percentage | |
|---|---|---|
| | "Off-state" | "On-state" |
| 5.4 μm | 40% | 30% |
| 7.6 μm | 42% | 29% |
| 10.8 μm | 42% | 29% |

In the current DLP product line, pixels with pitch 5.4 um have a pixel movement according to the TRP-type (Tilt and Roll); and pixels with a pitch of 7.6 and 10.8 um have a pixel movement equal to what was introduced in the FTP-type, which is a tilting of the mirror over a diagonal line (definitions and acronyms made by Texas Instruments)

This means that the image content (which determines the individual positions of the micro-mirrors) is also important to control the temperature of the DMD and the micro-mirror array in particular.

Thus, the absorbed heat load percentage on the light valve is a fraction of the incoming optical power that is absorbed by the light valve. The present invention provides means for determining the amount of light absorbed by the light valve, and thereby derive the percentage of absorbed heat load.

As explained in the following embodiments, the means for determining the amount of light absorbed by the light valve can be implemented in different manners, such as by analyzing the content of the images to derive the positions of the mirrors in the light valve, or using a second sensor, such as a temperature sensor or a photo-sensor. In the case of a photo-sensor, there are many different possibilities for its implementation, i.e. in the light dump, on the projection screen, etc. The different means can also be combined in different ways.

Figure 3:
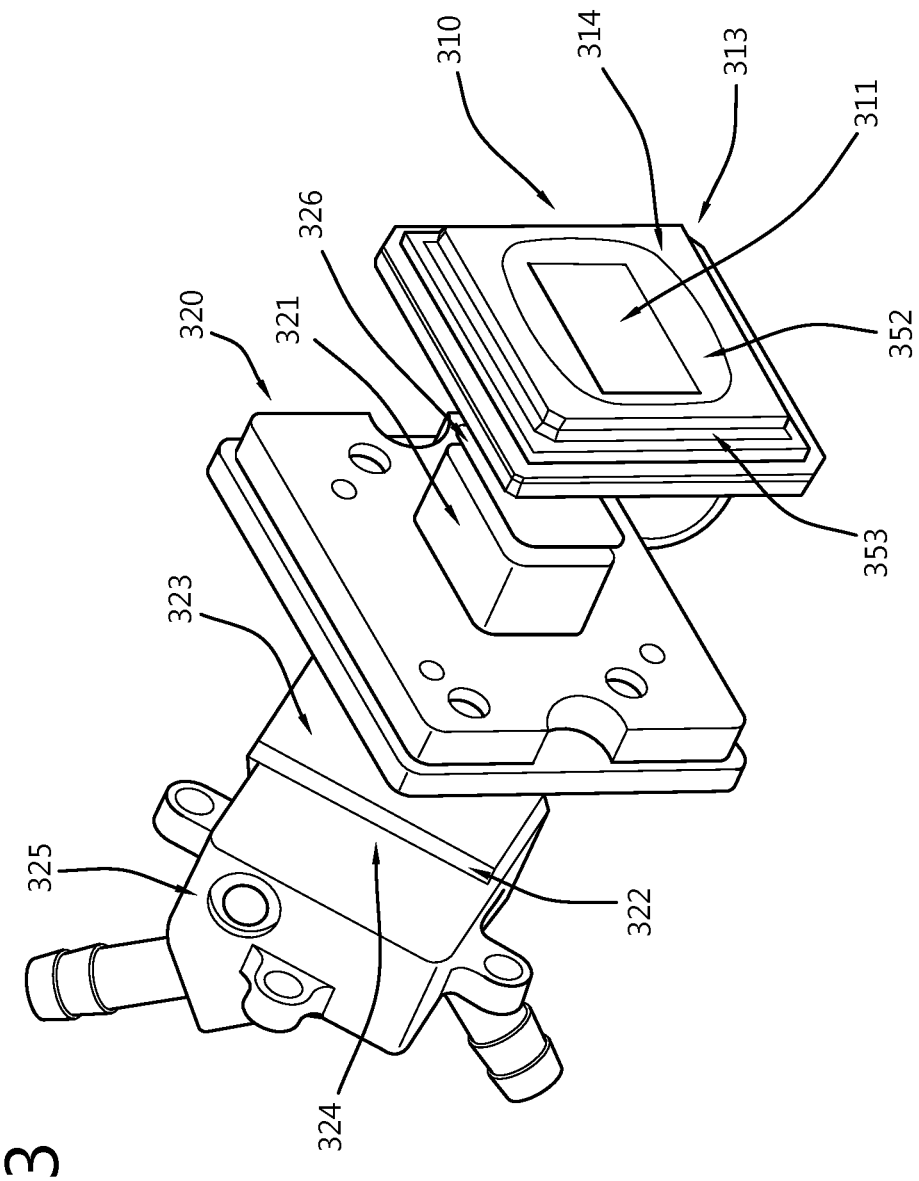
FIG. 3 shows an exploded view of (part of) a temperature control system to control the temperature at a back side of a DMD according to embodiments of the present invention.

FIG. 3 shows an example of an active heat transfer device for cooling the micro-mirror array in a first embodiment of the present invention.

A package 310 is shown comprising a reflective spatial light modulator, e.g. DMD light modulator 311, held in a casing 353. The casing 353 is closed at its front side 313 by means of a transparent window, e.g. glass window 352. At the backside 312 of the package 310 (not visible in FIG. 3), a heat transporting means 320 is provided, comprising the thermally conductive, e.g. metal stud 321, which is coupled to the backside of the spatial light modulator 311 via thermal interface material 326, which interface material 326 is thermally conductive and possibly electrically insulating. The stud 321 is connected to a cooling device, e.g. to a cold side 323 of a Peltier element 322. The warm side 324 of the Peltier element is brought into contact with a heat dissipating means 325, in this case a liquid cooled heat sink. The pump driving the liquid of the liquid cooled heat sink can either be always ON at a given flow rate or the flow rate can be modulated/controlled by the controller of a control system.

Figure 4:
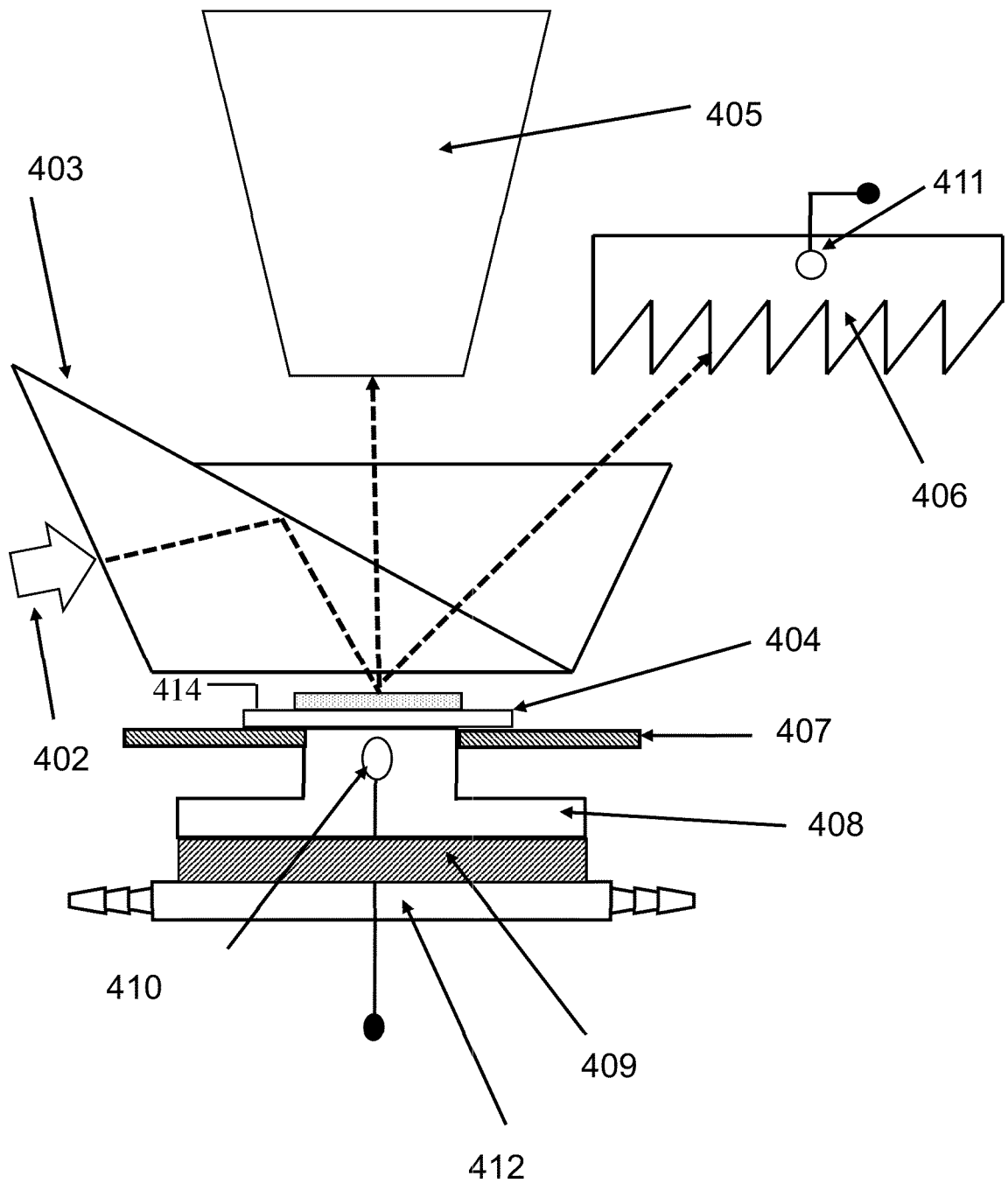
FIG. 4 shows a schematic representation of a DMD and associated cooling means, a light source illuminating the DMD through a prism assembly, wherein the light is reflected towards a light dump or projection optics, and a first and a second sensor for measuring, according to a first embodiment of the present invention.

In a first example of an embodiment of the present invention shown on FIG. 4, a first sensor 410 measures the temperature of the light valve 404. The light valve 404 can be positioned on a Printed Circuit Board 407 and is in thermal contact with a metal stud 408. In the example of FIG. 4, the light valve 404 is a DMD and the metal stud 408 contacts the backside of the package of the DMD through a hole in the PCB 407. As in FIG. 3, a thermal interface material can be used between the metal stud 408 and the package of the light valve 404.

A light source 401 illuminates the light valve 404 through a prism assembly 403. The light 402 is reflected towards projection optics 405 or towards a light dump 406 in function of the position of the micro-mirrors of the light valve 404. A second sensor 411 measures the amount of light that is being reflected towards the light dump 406. A third sensor 414 can be used to measure a second temperature on a second part of the light valve 404 and can be placed on or in front of the light valve 404. A first active heat transfer device 409 transfers heat to or from the metal stud 408. By cooling or heating-up the metal stud, it also cools or heats up the light valve 404.

As in the case of FIG. 3, the Peltier element is in contact with a heat sink 412, in the example of FIG. 4, the heat sink is a liquid cooled heat sink.

Figure 5:
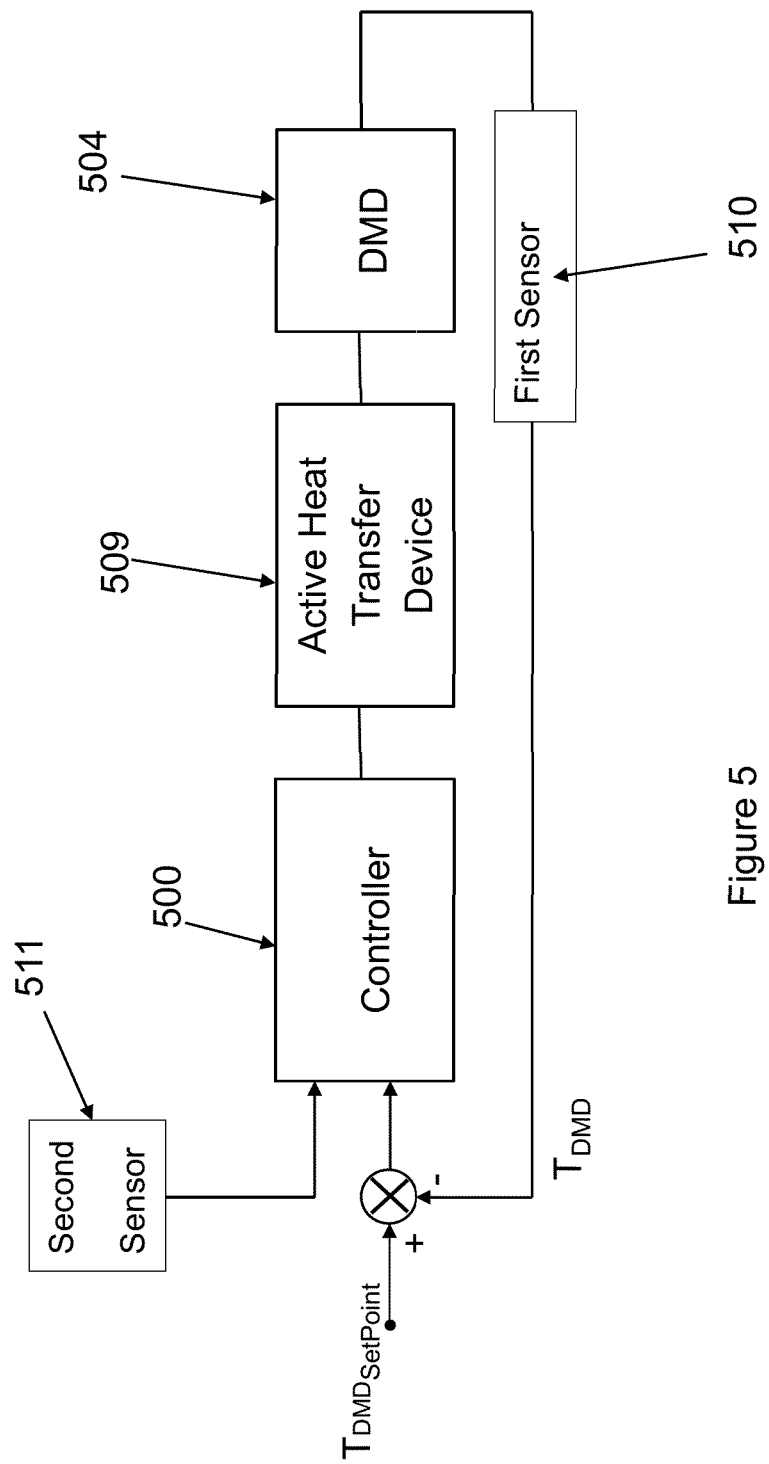
FIG. 5 is a schematic representation of a control loop for controlling a temperature of a light valve according to an embodiment of the present invention.

The principle schematic of a control loop according to a first embodiment of the invention is given on FIG. 5. A controller 500 uses two input signals to drive the effector 409 (e.g. the first active heat transfer device 409).

The first signal is the difference between a temperature set point $T_{DMDSetPoint}$ for the light valve 504 and the actual temperature of the light valve $T_{DMD}$ as measured by the first sensor 510.

The second signal is representative of the "white level" and/or the "black level" (both being representative of the position of the micro-mirrors which influence the radiative transfer between the source of light 401 and the light valve 404/504.

In general, the second signal can be obtained by any of the means for determining the amount of light absorbed by the light valve.

The second signal can be used in different fashions. It can for instance be used for gain scheduling where the scheduling variable is determined by the measurements made with the second sensor (e.g. the white level) or the means for determining the amount of light absorbed by the light valve. The parameters Kp, Ki and Kd of a PID regulator are stored in a look-up table (see example of Table 2), different set of parameters corresponding to different intervals for the measured second signal.

TABLE 2

| Second Signal | Kp | Ki | Kd |
|---|---|---|---|
| From 0 to S1 | Kp0 | Ki0 | Kd0 |
| From S1 to S2 | Kp1 | Kp1 | Kd1 |
| ... | ... | ... | ... |

Instead of gain scheduling, the second signal can be used for feedforward control (done in parallel with feedback control): the second signal is used to evaluate the fraction of the incident optical power that is absorbed by the light valve. The fraction of the incident optical power absorbed by the light valve is treated as a disturbance measured (or evaluated) by the second sensor. A compensation signal is added to the signal u(t) to drive the heat transfer element as illustrated on FIG. 5 and FIG. 8.

The first sensor 410 can be positioned at or close to the back of the DMD 404. The metal stud having a high thermal conductivity, the temperature it measures is close to the actual temperature of the back of the DMD 404 and the first sensor can be e.g. positioned within the metal stud 408. The first sensor 410 can also be integrated in the DMD package itself. The first sensor can for instance be integrated in the substrate on which the micro-mirror array stands.

Instead of a second sensor 411, the means for determining the amount of light absorbed by the light valve can be provided by a software or "software sensor" (as its output is used in the same way as the output of a sensor) that analyzes the content of each image being projected and which evaluates the percentage of the light illuminating the light valve that will be absorbed by the light valve. The software or "software sensor" can be e.g. implemented in an FPGA receiving the data to control the individual pixels of the light valve. In its simplest implementation, the software sensor is a digital filter that computes an average position for the micro-mirrors and outputs an estimated radiative heat transfer between the light source 401 and the light valve 404. The estimated radiative transfer can for instance be based on table 1. If the software sensor determines that all pixels are off (fully black image), the radiative heat transfer is 40%. If the software sensor determines that all pixels are ON, the radiative heat transfer is 30%. A linear interpolation can e.g. be used in first approximation to determine the radiative heat transfer for intermediate configurations of the micro-mirrors. For instance, if half the micro-mirrors are in the OFF state and the other half is in the ON state, the radiative heat transfer is estimated to be 35%.

For instance, if all the micro-mirrors are duty cycled at 50%, the radiative heat transfer is estimated to be 35%.

The second sensor 411 can also use a Look Up Table to allow more complex interpolation schemes.

The second sensor 411 can be a photo-sensor like a photodiode or a phototransistor. The output of the second sensor can be low-pass filtered to eliminate variations that are faster than e.g. the response time of the active heat transfer device.

When the second sensor 411 is a photo-sensor, it can be used to determine the white level. This can be particularly useful when the light valve is based on Liquid Crystals (like e.g. LCOS or a liquid crystal panel) and when the pixels are either reflective or not. For such devices, it is more difficult and sometimes impossible to redirect light towards a light dump. The photo-sensor can be directed to the screen 20 on which images are projected. The amount of light reflected by the screen 20 and reaching the second sensor 411 is representative of the "white level" and gives information on the position of individual pixels of the light valve. If the light valve is a Liquid Crystal panel, the more light reaches the screen, the less pixels are off (entirely or partially) and the less power is stopped and absorbed by the light valve. If on the contrary, all the pixels of the light valves are OFF, no light reaches the screen 20 and the radiative heat transfer between the light source and the light valve is at its maximum.

Information on the amount of light reaching the projection screen (in other words the "white level") is thus important to evaluate how fast the temperature of the light valve will increase under the influence of the light source.

A condenser lens and an integrator can be used to average the light reflected by the projector and reaching the second sensor 411.

The second sensor can be positioned between the light valve and the light dump or at or near the light dump. By measuring the amount of light redirected to the light dump, the second sensor gives information on the state in which the micro-mirrors of the light valve 404 are. Similarly to the previous case, the information on the amount of light reaching the light dump gives information on the state of the micro-mirrors and the radiative transfer between the light source and the light valve.

The geometry of the light dump can be adapted to provide some level of integration to have a uniform illumination of the light dump and guarantee that the signal delivered by the sensor will be representative of the amount of light reflected towards the light dump.

A first example of modified light dump 61 is given on FIG. 6A. An integrating spherical cavity 62, formed in a block of a material having good thermal conductivity, receives light through an opening 63. The material of the light dump can be e.g. copper, aluminum, steel . . . . The cavity acts as an integrator for the second sensor 611.

Light 64 enters the cavity 62 through window 65. The face 66 of window 65 inside the cavity is coated with a diffuser or has been processed to diffuse light. The window can be e.g. sandblasted glass, UV fused silica ground glass, opal diffusing glass . . . .

A second example is given on FIG. 6B. The walls of the cavity 62B are coated with an absorbent diffusive material.

In both cases, the light dump 61 has cooling fins 67.

Alternatively, the amount of light redirected towards the light dump is evaluated by measuring the temperature of the light dump. In that case, the second sensor can be a temperature sensor contacting the light dump or positioned inside the light dump like e.g. in a cavity to accommodate the sensor.

The light dump having a thermal inertia; it will smooth out rapid variations of temperature and provide some level of low-pass filtering.

When the second sensor is a temperature sensor, its readings can be combined with those of a fourth temperature sensor measuring the temperature within the projector. The difference measured between the second sensor and the fourth sensor is more representative of the amount of light that is re-directed towards the light dump.

More generally, temperature sensors can be used to measure a set of temperatures or the temperature distribution of the light valve. In fact, in order to reduce temperature gradients within the light valve, having a plurality of measurements is an advantage. For example, the temperature of the array, of the cover glass, the seam temperature when the cover glass is glued, the mask temperature.

When the light valve is a DMD, it is necessary to keep the temperature difference between the front of the DMD and the back of the DMD within given limits.

Figure 7:
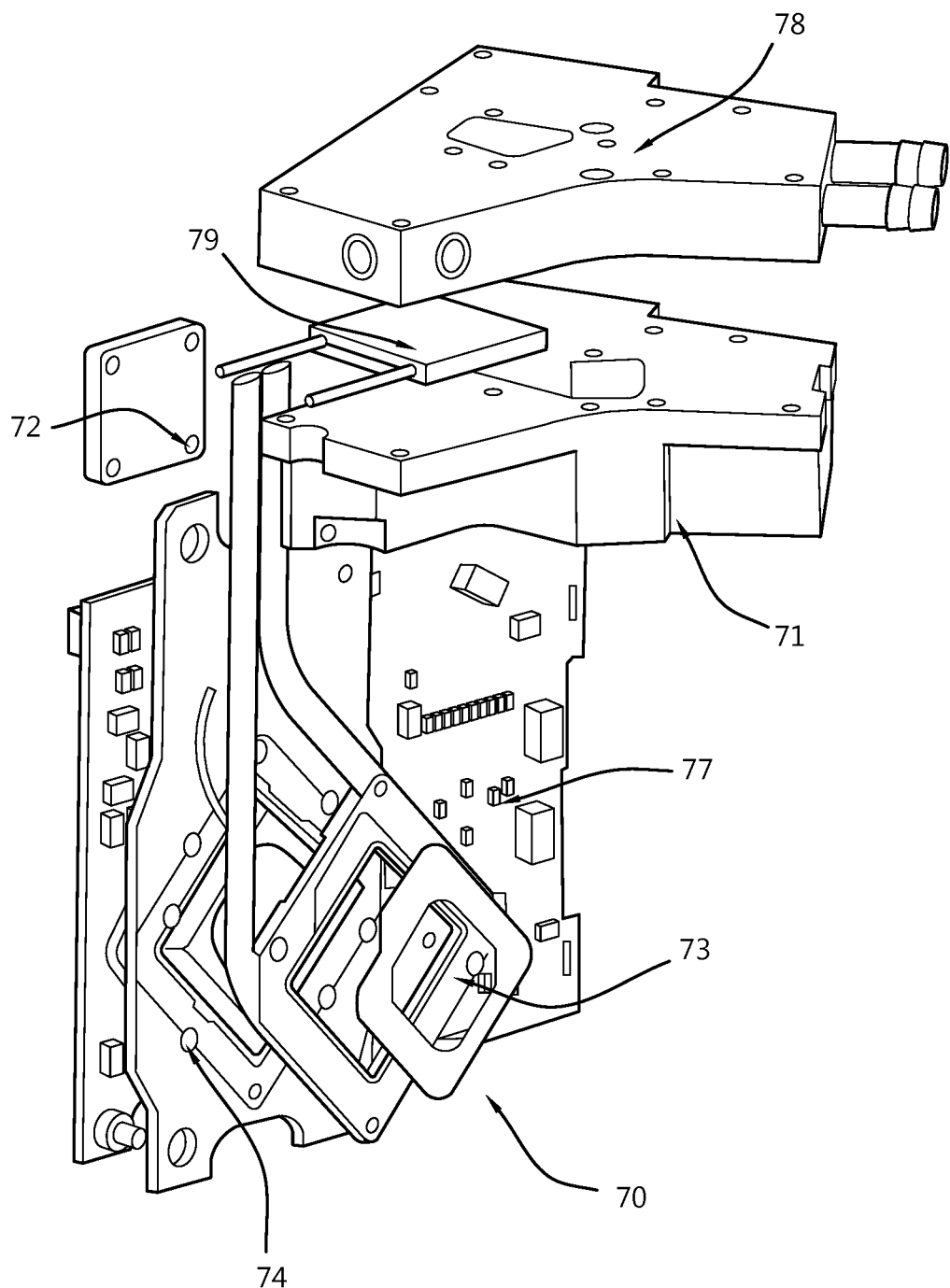
FIG. 7 gives an example of a cooling system to control both the temperature at the back of the DMD as well as at the front of the DMD according to an embodiment of the present invention.

To that end, a second active heat transport device is used to control the temperature at the front of the DMD. An example of cooling system to control both the temperature at the back of the DMD as well as at the front of the DMD is given on FIG. 7. A heat pipe 72 is in thermal contact with the front side of the DMD 74. A Peltier element 79 transfers heat from the heat pipe to a liquid cooled heat sink 78. A thermal interface 71 improves the heat transfer between the hot side of the Peltier element and the liquid cooled heat sink 78.

Figure 8:
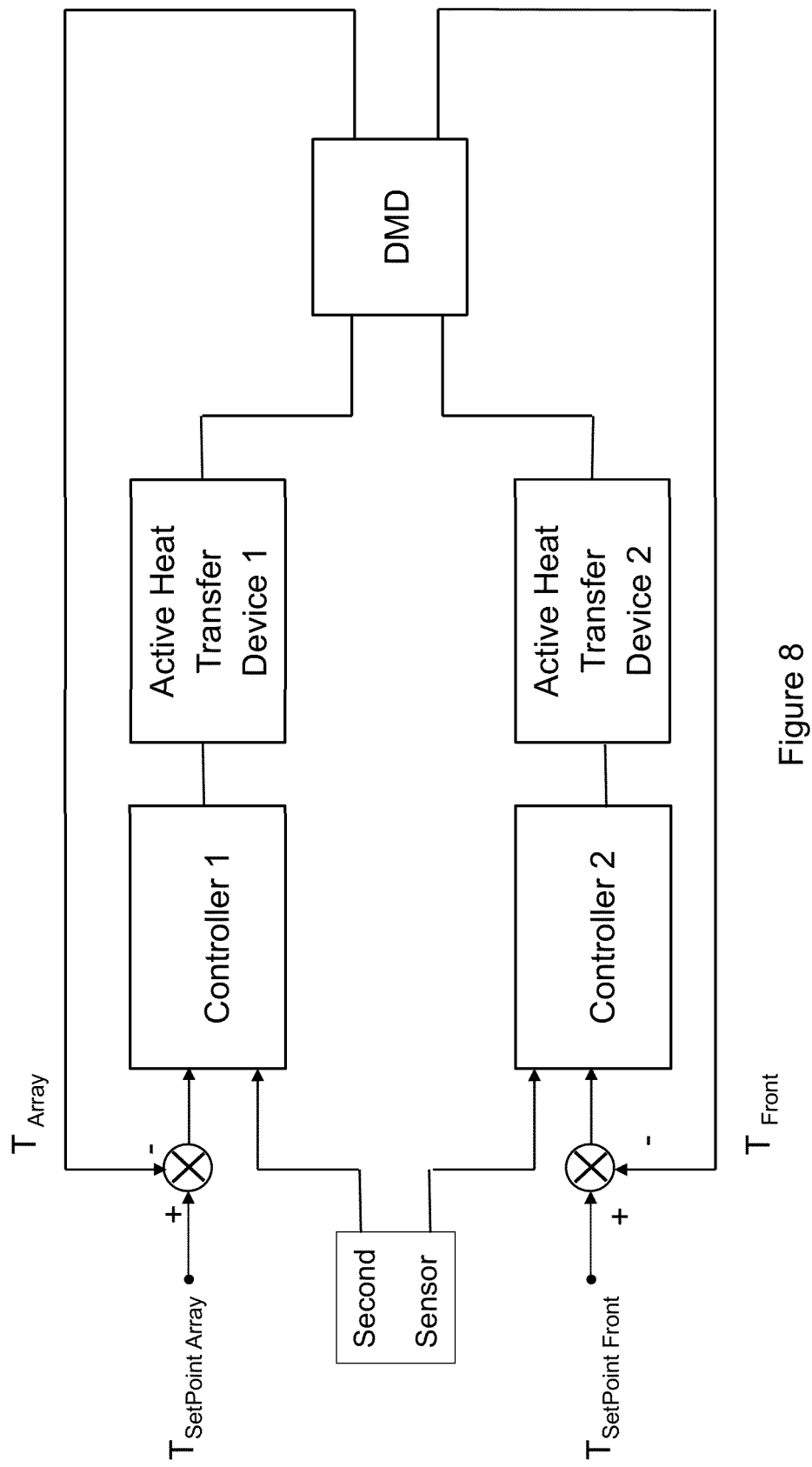
FIG. 8 is a schematic representation of a control loop for controlling a temperature of a light valve according to an embodiment of the present invention.

A control system adapted to regulate the temperature of the micro-mirror array and the temperature at the front of the DMD as well is given on FIG. 8.

A third temperature sensor measures the temperature of the front of the DMD and a second active heat transfer device is used to control the temperature of the front of the DMD. On the example of FIG. 8, the two active heat transfer devices are controlled independently of each other by distinct controllers.

The first controller uses both the measurements of the first sensor and the second sensor to drive the first active heat transfer device in order to control the temperature of the micro-mirrors array (alternatively, the back of the DMD package).

The second controller uses both the measurements of the third sensor and the second sensor to drive the second active heat transfer device and adjust the heat flow of said active heat transfer device in order to control the temperature at the front of the DMD package.

Any type of controller can be used (fuzzy regulator, neural network, digital or analog . . . ). The output of the second sensor can be used in diverse fashions. The output of the second sensor can be used for self-tuning. For instance, in a power-up sequence, the second sensor can be used to evaluate the optical power of the light illuminating the light valve. If the second sensor is at or near the light dump, all pixels of the DMD are set on the OFF position and all the light is reflected towards the light dump. By combining the readings of the first sensor, the second sensor, the third sensor and/or the fourth sensor, a black box model or a grey box model of the system can be derived (a procedure known as "system identification"). Parameters for the controller of the control system can be derived from the model.

The output of the second sensor can be used for adaptive control. One of the parameter to be estimated is the rate of transfer of radiative energy between the light source and the light valve.

Alternatively, the controller driving an active heat transfer device can be a single input controller.

The measurement made by the second sensor is used to determine the desired temperature for the light valve.

Figure 9:
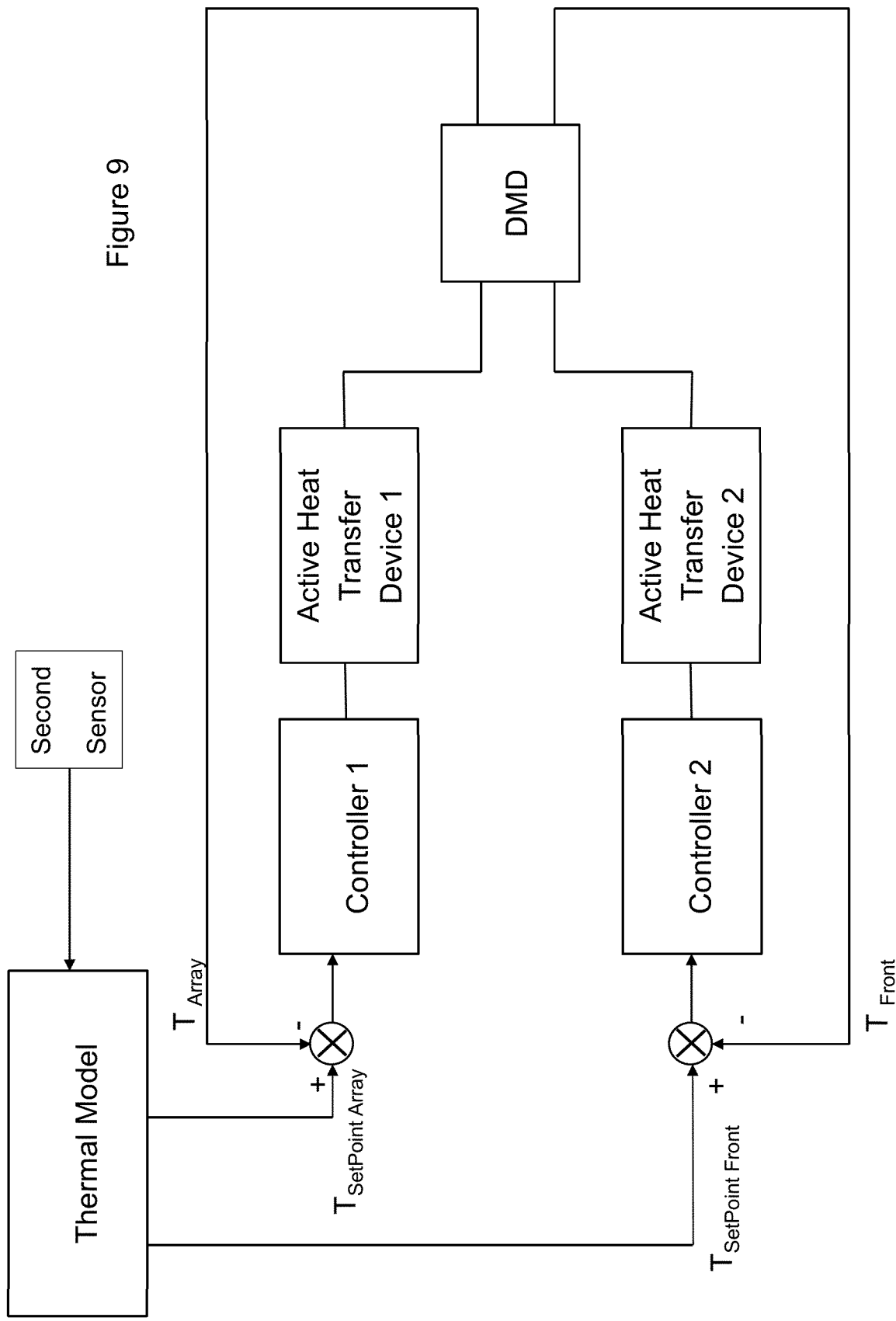
FIG. 9 is a schematic representation of a control loop for controlling a temperature of a light valve according to an embodiment of the present invention.

When the temperature difference between the front and backside of the light valve is controlled as well, the measurement made by the second sensor is used to determine the desired temperature for the backside of the light valve and for the front side of the light valve. A principle schematic of a control system for that case is given on FIG. 9 where $T_{SetPointArray}$ and $T_{SetPointFront}$ are the temperature of the micro-mirror array or the temperature at the backside of the light valve and the temperature at the front side of the light valve respectively.

The second sensor can give information on the "white level" (i.e. the number of micro-mirrors reflecting the light illuminating the light valve towards the projection optics or in other words, the fraction of the light illuminating the light valve that is reflected towards the projection optics). The second sensor can also give information on the dimming of the light source.

By setting all micro-mirrors in a given state (e.g. ON or OFF) and by measuring either the amount of light re-directed towards the projection optics when all pixels are in the OFF state (as described earlier, the light reflected by the projection screen can be monitored by a photo-sensor) or by measuring the amount of light re-directed towards the light dump, one gets an evaluation of the amount of light illuminating the light valve. If this is done at regular intervals (in a manner similar to "black" frame insertion); the second sensor can also be used to evaluate dimming of the light source.

If the light source is dimmed, evaluating dimming can be necessary to optimize the control system.

If the second sensor is a more sophisticated photosensor; e.g. if the second sensor can also discriminate between colors and evaluate the spectrum of the light source, the second sensor can also be used to identify the type of light source used in the projector. Projectors can be retrofitted. For instance, the light source of the projector can be a high-pressure lamp and can be replaced by a laser light source. The nature or type of the light source used in the projector can influence the radiative heat transfer between the light source and the light valve and/or its package.

Even if the image data and/or the metadata that accompanies it are not accessible (as would be the case in digital cinema), dimming can be evaluated with the second sensor. Alternatively, dimming can be evaluated by e.g. measuring the current drawn by the light source.

In a further embodiment of the invention, the second sensor measures the amount of light reaching the light dump (its intensity) as well as its color or a light spectrum.

In the example of FIG. 8, the two control loops operate independently of each other. Alternatively, one of the control loops can depend on the other control loop. In a first alternative, the set point for the temperature of the front side of a DMD is taken as a reference. The first control loop regulates the temperature of the front side of the DMD. Since the temperature difference between the front side and the backside of the DMD must be kept within a given interval, the temperature of the backside should "follow" the temperature of the front side. Therefore, the set-point for the temperature of the backside is taken as a function of the temperature of the front side: $T_{SetPoint\ Array}=T_{Front}-\Delta T$ where $\Delta T$ is a chosen temperature difference between the front side and the back side. The setpoint for the second control loop is thus not constant anymore.

In a second alternative, the setpoint for the temperature of the back side of the DMD is taken as reference. In that case, the setpoint for the temperature of the backside of the DMD is constant and the setpoint for the temperature of the front side of the DMD is $T_{SetPoint\ Front}=T_{Array}+\Delta T$ where $\Delta T$ is a chosen temperature difference between the front side and the back side. In this case, it is the setpoint for the first control loop that is not constant anymore.

Figure 10:
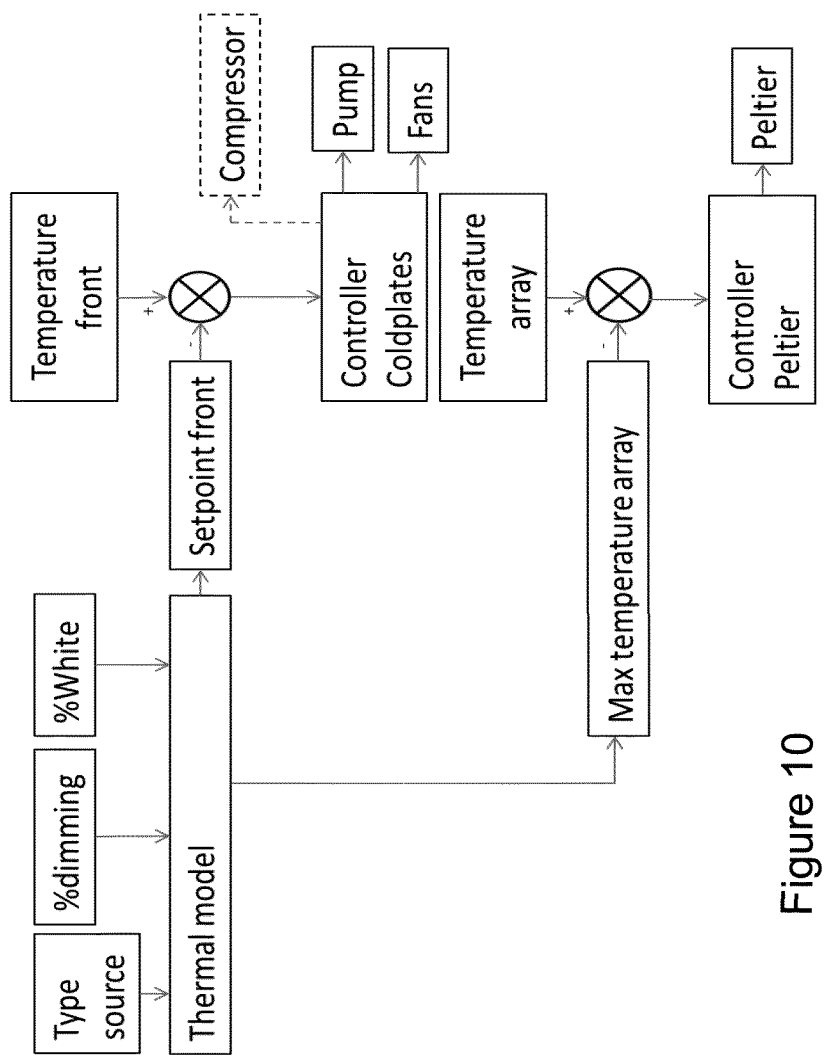
FIG. 10 is a flow chart showing a control scheme according to an embodiment of the present invention.

FIG. 10 illustrates a control system where the type of lamp, the dimming and the white level are used to determine by means of a thermal model the setpoint to be used for the temperature at the front and the maximal temperature of the array. Given the temperature at the front of the DMD, the controller activates the cooling system and from there the new temperature of the array is evaluated. This approach uses the front temperature as a priority input for driving the cooling system because (in this case) it's the slowest to react (liquid cooling system has a big inertia), the back has an extra Peltier element which can react must faster. Additional checks need to be performed at all times such as to ensure that the temperature of the array is always below an upper limit, for example 65° C., and ensure that the temperature of the hot side of the Peltier element is always lower than a maximal continuing working temperature which is about 80° C. for standard Peltier coolers and can reach 200° C. for high temperature thermoelectric Peltier cooler.

This array temperature is then compared to the maximal temperature of the array evaluated with the thermal model. Based on this comparison, the controller activates the cooling system, such as a Peltier element. This control scheme is used in the following embodiments.

Figure 11:
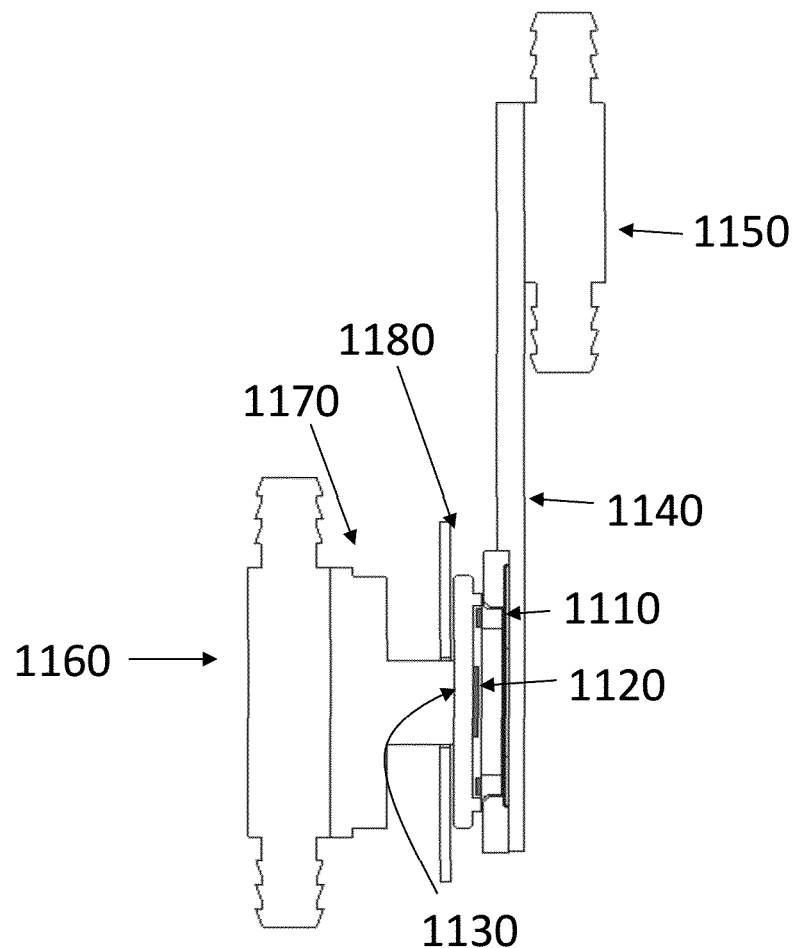
FIG. 11 is a side view of a DMD and a back and front cooling system according to embodiments of the present invention.

FIG. 11 shows an embodiment of a light valve cooled on the front side and on the back side. The backside of the DMD is in contact with a metal stud 1180 or heat sink. A thermal grease or paste can be used to improve the transfer of heat from the DMD to the metal stud. The metal stud is cooled by e.g. a liquid circulating through the heat exchanger 1160. Heat is also evacuated from the front side of the DMD by a heat pipe 1140. The heat evacuated by the heat pipe 1140 is then transferred to a liquid coolant (e.g. water) by means of heat exchanger 1150. In this embodiment, the cooling solution is fixed up front with the use of the thermal model to minimize the gradient inside the package.

In order to control the temperature of the array of the DMD, the temperature at the front 1110 and the temperature at the back 1130 are measured. The temperature of the array is calculated using a thermal model. For example, it can be measured with the following formula:

$$T_{array}=T_{back}+P_{elec}R_{package}+P_{illumination}\times Af\times R_{package}$$

wherein $T_{back}$ is the temperature of the DMD measured at the back, $P_{elec}$ is the electrical power provided to the DMD, $R_{package}$ is the thermal resistance of the DMD package, $P_{illumination}$ is the illumination power, Af is the absorption factor of the DMD which changes with the content of the image projected by the light source. When a black image is projected onto the DMD, the absorption factor is high, when a white image is projected, the absorption factor is low. It is assumed in this model that the absorption is uniform.

$T_{front}$ represents the temperature measured at the front of the DMD. The temperature is measured at the location of the getter strips. The getter strips are for example a porous medium filled with Teflon particles used for lubricating the mirrors. The getter strips also absorb the moisture at the edges of the mirrors. However, in the presence of too much moisture, the mirrors may get stuck. If the temperature of the array, T$_{array}$, is lower than the temperature of the front T$_{front}$, the Teflon particles may get absorbed and get stuck in the getters, this may damage the mirrors and thereby damage the projector. And if the temperature is too high, the getters can release the absorbed moisture that was absorbed before, and the mirrors may get stuck, which is not reversible. This is the main reason why the temperature gradient within the DMD package has to be limited to a range of about 20° C. The following patents describe these problems U.S. Pat. Nos. 5,331,454, 6,300,294, 8,436,453.

Figure 12:
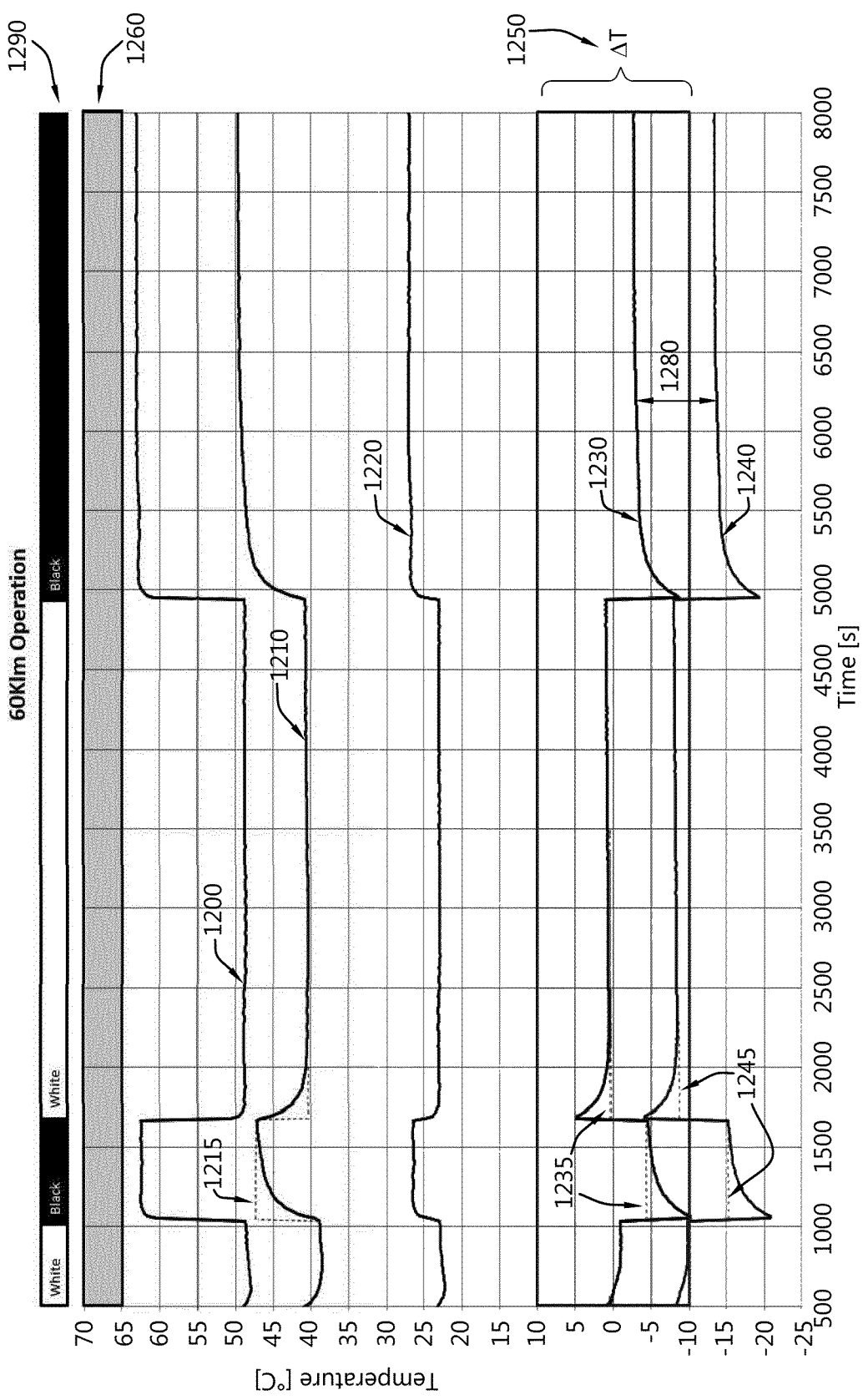
FIG. 12 is a graph which represents the variation of the temperatures over time at various locations of the DMD of FIG. 11 as a function of image content for a projector projecting 60 Klm according to an embodiment of the present invention.
Figure 13:
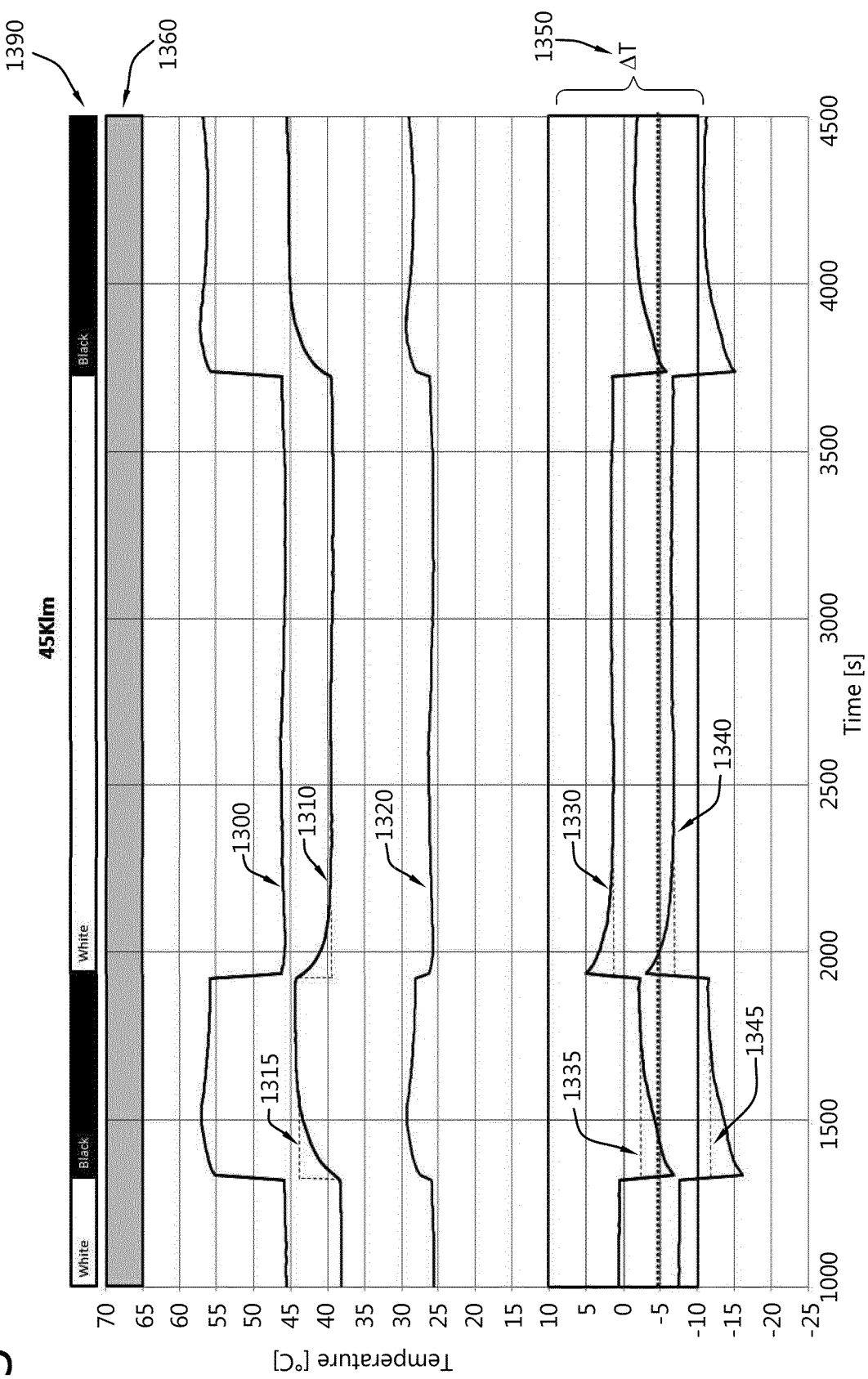
FIG. 13 is a graph which represents the variation of the temperatures over time at various locations of the DMD of FIG. 11 as a function of image content for a projector projecting 45 Klm according to an embodiment of the present invention.

FIG. 12 and FIG. 13 show diagrams which represent, as a function of the content of images 1290, 1390 projected on the DMD over time, the measured temperature at the front of the DMD 1210, 1310, at the back of the DMD 1220, 1320, the calculated temperature of the array 1200, 1300 but also the maximum allowable temperature variations within the array 1230, 1240 and 1330, 1340. The content of the images in this example corresponds to the two extreme cases, i.e. white or black images. FIG. 12 shows measurements performed with 60000 Lm on the DMD and FIG. 13 shows temperature measurements performed with the same projector with dimming up to 45000 Lm on the DMD during respectively 8000 seconds and 4500 seconds.

Figure 15:
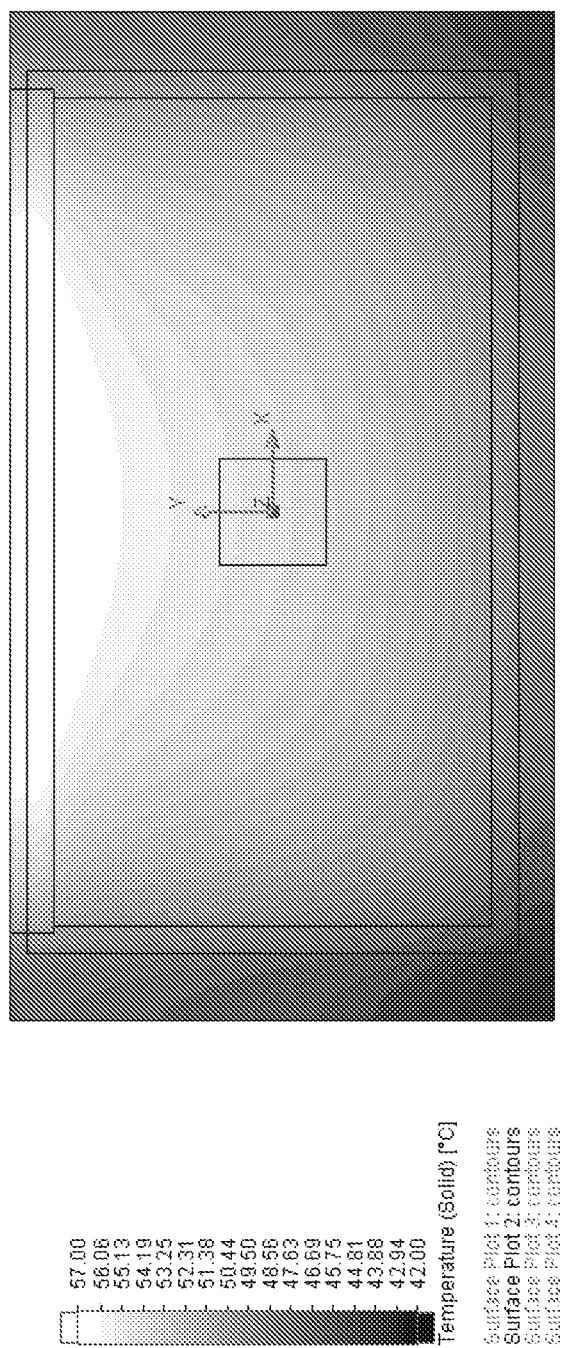
FIG. 15 shows the temperature distribution across the array of a DMD.

The maximal allowable temperature variations between the array and the getter strips have to stay within a range of for example ±10 degrees, as indicated in FIGS. 12 and 13 with references 1250 and 1350. Above this range, there is a strong risk of damaging the DMD. This range may depend on the type of DMD used. As the temperature within the array is not uniform, the maximal variation can be estimated with $$\Delta T_{Max} = T_{front} - T_{array} - \nabla T_{array,max}$$

wherein $\nabla T_{array,max}$ is the maximal temperature gradient within the array. An example of temperature gradient within the array is shown in FIG. 15. The temperature is usually higher in the middle of the higher part of the array. The difference between the maximal temperature and the minimal temperature of the array is in this embodiment about 10° C.

The minimal variation is calculated as $$\Delta T_{min} = T_{front} - T_{array}.$$

$\Delta T_{Max}$ and $\Delta T_{min}$ are respectively indicated with reference numbers 1230, 1330 and 1240, 1340. The difference between the two curves corresponds to the temperature gradient within the array 1280.

Figure 16:
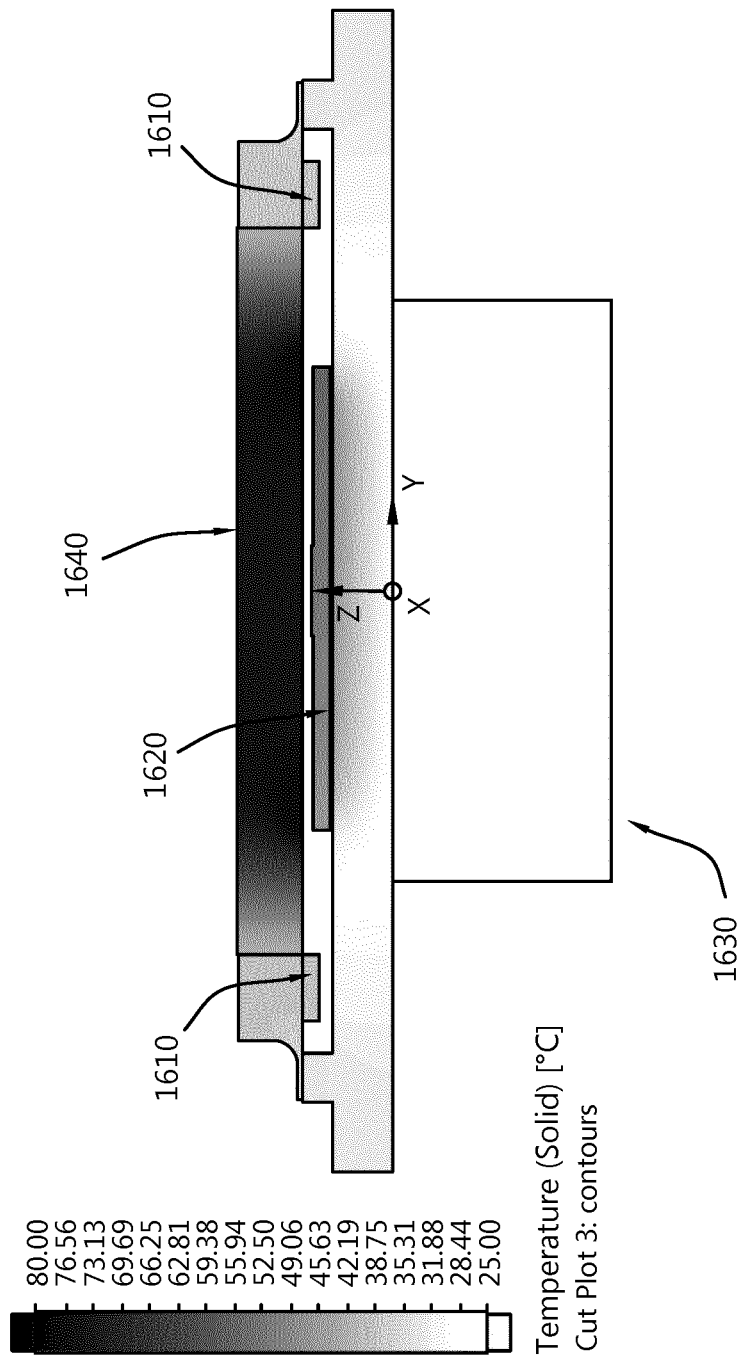
FIG. 16 shows the temperature distribution across a DMD, its array, the front, the getter strips, the back of the DMD, the heat sink.

FIG. 16 illustrates a side view of a DMD package which comprises the getter strips 1610, the array 1620, the metal stud 1630 which acts as a heat sink and the optical window 1640. The temperature within the package is illustrated with the grey shades.

The maximal temperature of the array allowed is 65-70° C. 1260, 1360 and is shown on FIGS. 12 and 13. Above this temperature of operation, the risk of inducing damages within the mirrors of the array is important and thus the temperature should not go above temperatures of 65-70° C.

As shown in FIGS. 12 and 13, when the image content is white, the temperatures shown in the graph are lower. When the image content is black, the absorption by the DMD is higher and the temperature is increased.

In order to reduce the differences in temperature between the array and the getter bars when the image content changes, the controller has to have a quick response to simultaneously cool the front of the DMD.

For example, as shown on FIG. 12, near second 1000, the change of image content from white to black induces a steep temperature variation with a time constant of about 20-30 second, within the array 1200 due to the absorption factor which is strongly dependent on image content. On the contrary, the temperature increase near the getter bars shown with curve 1210 is slower and has a time constant of about 2 minutes. This results in a peak in the $\Delta T_{min}$ and the $\Delta T_{Max}$ curves. The amplitude of the peak is even larger as the temperature measurements are sampled. Thus, in order to reduce the peak, the temperature of the front T$_{front}$ has to be actively reduced and thus the controller has to respond quickly to the change in image content, from a time constant of about 2 minutes to a time constant of about 20 seconds. This can be done by adding the image content to the controller. A similar result is shown in FIG. 13 near the measurement at second 1300. This improvement is shown with the dashed line 1215 and 1315 respectively on FIGS. 12 and 13 and the result (peak reduction) on the $\Delta T_{min}$ and the $\Delta T_{Max}$ curves with 1235, 1245, 1335, 1345.

Another problem that these curves show is that the average temperature differences between the getter bars (T$_{front}$) and the array (T$_{array}$) is not zero and some of the peaks are out of the allowable range of temperature variations between the array and the getter strips which is of ±10 degrees. To reduce this second problem, the temperature at the front of the DMD should be adjusted at all times. In this embodiment, an increase of about 5° C. would cancel the peaks falling outside of the range of ±10 degrees.

In order to reduce the amount of cooling required, and also to reduce the audible noise, in particular when the light source is dimmed in the example of FIG. 13, the temperature of the array T$_{array}$ should be increased so it is closer to the limit of 65° C. This is performed by increasing the temperature of the back T$_{back}$. The T$_{front}$ will have to be adjusted accordingly so the temperature variations stay in the allowed range.

In a further aspect of the invention, the temperature control of a light valve is done independently of the temperature control of other light valves.

It is an advantage of that aspect of the invention that the control will be more efficient and will reduce the thermal gradient across the light valve. When a light valve is used to project a single color like e.g. red, green or blue, the optical power arriving on the light valve is not the same for each of the light valves.

The light output is very dependent on the wavelength the light source emits. For instance: to have the same luminous flux for lasers emitting at 620 nm and 640 nm red power on the 640 nm red lasers must be doubled.

This is for instance the case for a 6P projector for 3D applications. In this case, there are 2 laser sources per primary color, thus short and long wavelength red, green and blue respectively. Especially in the case of red, much more laser power has to be used for the long wavelength red than for the short wavelength red, because there is less luminance in the long red (the lumens per Watt are lower). In case of "color 3D" the image is represented in 120 Hz, and the two laser sources are alternatively turned on and off. As a result, and thus especially in red, there is a varying heat load on the DMD.

The luminous flux needed in each color channel depends on the native white-point chosen for the projector. For example, a luminance contribution of 16% red, 77% green and 7% Blue, when converted to power, may come down to a power distribution of i.e. 40% Red, 33% Green and 27% Blue. This is naturally very dependent on the used light sources.

The light valves used for the different colors are thus exposed to different luminous fluxes and will be heated differently. To regulate the temperature of each light valve as well as possible and with as little stress as possible on both the light valve and the temperature control system.

Each of the control loops can use different heat exchange devices in function of the color of the light illuminating the light valve.

Figure 14:
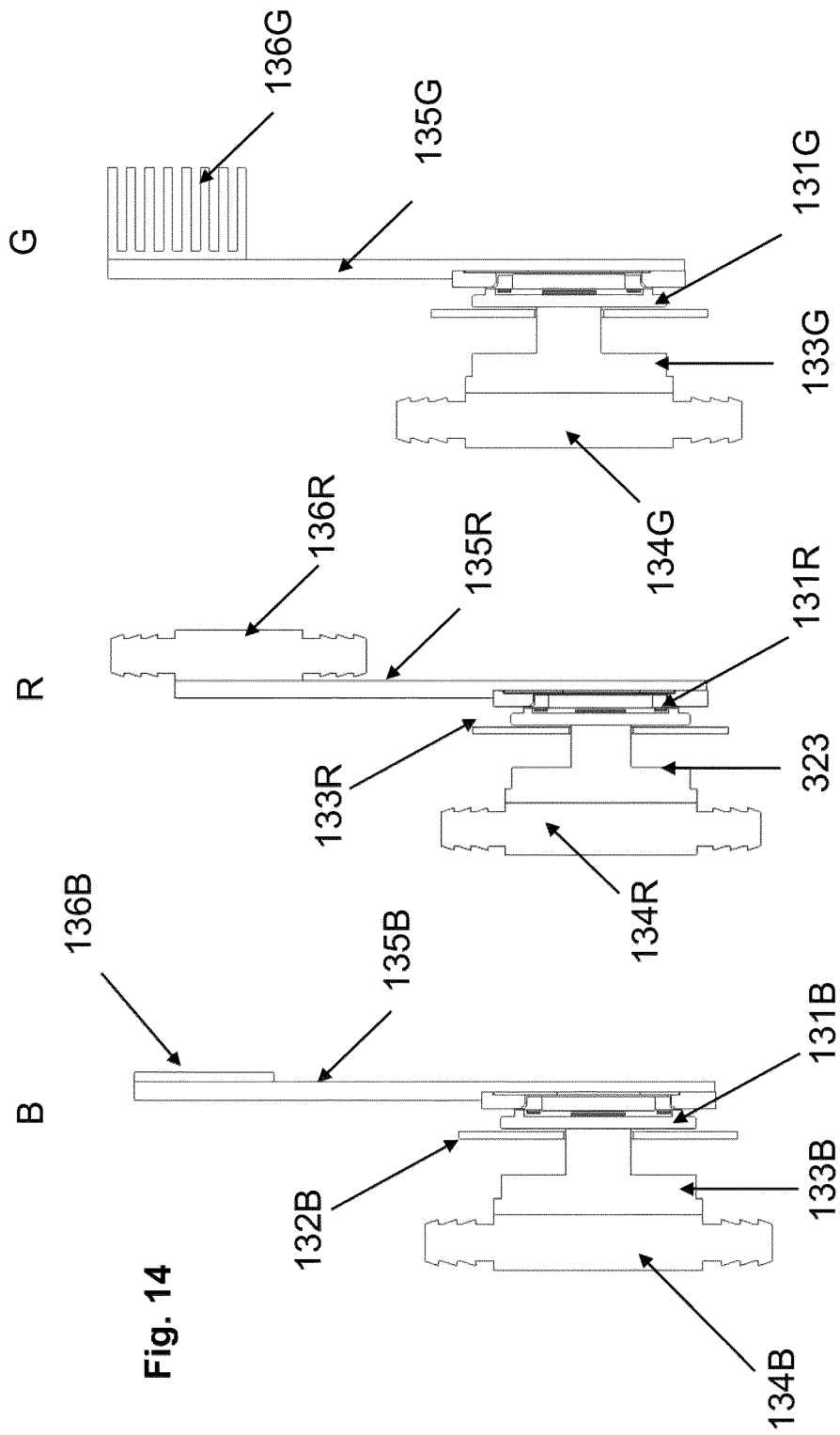
FIG. 14 is a schematic representation of three DMDs, each DMD being associated to a R, G or B color, and comprising a different cooling system in the front and in the back, according to embodiments of the present invention.

An example is given on FIG. 14. A DMD is dedicated to a single color: the DMD 131R is illuminated by Red light, the DMD 131G is illuminated by green light and the DMD 131B is illuminated by blue light. Each DMD is mounted on a PCB: 132R, 132G and 132B for the DMD 131R, 131G and 131B respectively.

The backside of each DMD is in contact with a metal stud or chuck: 133R, 133G and 133B for the DMD 131R, 131G and 131B respectively. A thermal grease or paste can be used to improve the transfer of heat from the DMD to the metal chuck.

The metal chucks 133R, 133G and 133B are cooled by e.g. a liquid circulating through the heat exchangers 134R, 134G and 134B respectively.

Heat is evacuated from the front side of DMD 131R, 131G and 131B by heat pipes 135R, 135G and 135B respectively.

For the DMD 131R, the heat evacuated by the heat pipe 135R is transferred to a liquid coolant (e.g. water) by means of heat exchanger 136R.

For the DMD 131G, the heat evacuated by the heat pipe 135G is transferred to a gas (e.g. air) circulated through a finned heat sink. The gas is typically kept in motion by means of e.g. a fan.

For the DMD 131B, the heat evacuated by the heat pipe 135B is transferred to a gas (e.g. air) by means of a simple heat exchanger 136B without fin.

In this embodiment, the cooling solution is fixed up front with the use of the thermal model to minimize the gradient inside the package.

In a projector comprising 6 primary RGB lasers with 60000 Lm, the projector had identical cooling systems for all three colors. Because of this, some DMDs were out of specification.

Tests showed that with this solution, the temperature of each of the three light valves (as well as the temperature difference between the front and the back of the DMD when the light valve was a DMD) stayed within the nominal temperature interval (even at high lumen output). When using the same temperature regulation hardware for each of the DMD, all other things being kept equal, the temperature of at least one of the DMD stayed outside of the nominal temperature interval for at least part of the time.

An embodiment of the present invention describing a temperature control system can be implemented by a digital device such as the controller with processing capability including one or more microprocessors, processors, microcontrollers, or central processing units (CPU) and/or a Graphics Processing Units (GPU) adapted to carry out the respective functions programmed with software, i.e. one or more computer programs. The software can be compiled to run on any of the microprocessors, processors, microcontrollers, or central processing units (CPU) and/or a Graphics Processing Units (GPU).

Such a device may have memory (such as non-transitory computer readable medium, RAM and/or ROM), an operating system, optionally a display such as a fixed format display such as an OLED display, data entry devices such as a keyboard, a pointer device such as a "mouse", serial or parallel ports to communicate with other devices, network cards and connections to connect to a network.

The software can be embodied in a computer program product adapted to carry out the following functions for such temperature control systems or methods, when the software is loaded onto the respective device or devices e.g. the controller and executed on one or more processing engines such as microprocessors, ASIC's, FPGA's etc.:

controlling the temperature of a light valve of a projection system, said light valve being illuminated by a light source, by using an output of a first sensor measuring a first temperature of a first part of the light valve, and controlling at least one active heating and/or cooling device to transfer heat between the light valve and a heat source and/or sink.

The software can be embodied in a computer program product adapted to carry out the following functions for such temperature control systems or methods, when the software is loaded onto the respective device or devices e.g. the controller and executed on one or more processing engines such as microprocessors, ASIC's, FPGA's etc.:

controlling the temperature of the light valve with the at least one active heating and/or cooling device according to the first temperature with respect to a reference temperature.

The software can be embodied in a computer program product adapted to carry out the following functions for such temperature control systems or methods, when the software is loaded onto the respective device or devices e.g. the controller and executed on one or more processing engines such as microprocessors, ASIC's, FPGA's etc.:

determining the amount of light absorbed by the light valve, and controlling the active heating and/or cooling device based on the amount of light absorbed by the light valve.

The software can be embodied in a computer program product adapted to carry out the following functions for such temperature control systems or methods, when the software is loaded onto the respective device or devices e.g. the controller and executed on one or more processing engines such as microprocessors, ASIC's, FPGA's etc.:

determining the amount of light absorbed by the light valve comprises analyzing the content of images projected onto the light valve and evaluating the amount of light illuminating the light valve that will be absorbed by the light valve. filtering an average position for the micro-mirrors and outputting an estimated radiative heat transfer between the light source and the light valve, which estimated radiative heat transfer is used to determine the amount of light absorbed by the light valve.

The software can be embodied in a computer program product adapted to carry out the following functions for such temperature control systems or methods, when the software is loaded onto the respective device or devices e.g. the controller and executed on one or more processing engines such as microprocessors, ASIC's, FPGA's etc.:

determining the amount of light absorbed by the light valve using a second sensor. Located in a light dump or in a proximity of the light dump, evaluating the amount of light not re-directed towards the projection optics.

The software can be embodied in a computer program product adapted to carry out the following functions for such temperature control systems or methods, when the software is loaded onto the respective device or devices e.g. the controller and executed on one or more processing engines such as microprocessors, ASIC's, FPGA's etc.:

evaluating the amount of light reflected on a screen by the projection optics, measuring at least two properties of light such as the wavelength or color and intensity, measuring light integrated by the light integrator.

The software can be embodied in a computer program product adapted to carry out the following functions for such temperature control systems or methods, when the software is loaded onto the respective device or devices e.g. the controller and executed on one or more processing engines such as microprocessors, ASIC's, FPGA's etc.:

Using a measured amount of light absorbed by the light valve for gain scheduling, for feedforward control, for adjusting the parameters of a PID controller, measuring a second temperature at a second part of the light valve and configuring a second active heating and/or cooling device to transfer heat between the second part of light valve and a heat source and/or sink, temperature is measured at the back of the light valve or in the front of the light valve.

The software can be embodied in a computer program product adapted to carry out the following functions for such temperature control systems or methods, when the software is loaded onto the respective device or devices e.g. the controller and executed on one or more processing engines such as microprocessors, ASIC's, FPGA's etc.:

controlling the second active heating and/or cooling device using the measurements of a third sensor and of the determined amount of light absorbed by the light valve in order to control the temperature at the second part of the light valve.

reducing the temperature difference between the temperature of the light valve array and of the front temperature around the light valve.

measuring the temperature in a fluid filling part or all of the optical system, the reference temperature is a function of at least one measurement made with the second sensor.

The software described above may be stored on a non-transitory signal storage means such as an optical disk (CDROM, DVDROM), a digital tape, solid state memory such as a flash drive, or similar.

The invention claimed is:

1. A cooling system for controlling temperature of a light valve of a projection system, said light valve being illuminated by a light source, the cooling system comprising:
    a first sensor for measuring a first temperature of a first part of the light valve,
    at least one active heating device, cooling device, or heating and cooling device to transfer heat between the light valve and a heat source, a heat sink, or a heat source and sink,
    a controller for controlling the temperature of the light valve with the at least one active heating device, cooling device, or heating and cooling device according to the first temperature with respect to a reference temperature,
    means for determining the amount of light absorbed by the light valve,
    and wherein the controller is further configured to control the active heating device, cooling device, or heating and cooling device based on the amount of light absorbed by the light valve.

2. The cooling system according to claim 1, wherein the means for determining the amount of light absorbed by the light valve comprises a second sensor.

3. The cooling system according to claim 2, wherein the second sensor is placed in the light dump or in a proximity of the light dump.

4. The cooling system according to claim 2, wherein the second sensor is at least one photo-sensor configured to evaluate the amount of light not re-directed towards projection optics of the projection system.

5. The cooling system according to claim 4, wherein:
    the at least one photo-sensor is a photo-diode or a photo-transistor, or
    the at least one photo-sensor is configured to evaluate the amount of light reflected on a screen by the projection optics, or
    the at least one photo-sensor is configured to measure at least two properties of light such as the wavelength or color and intensity.

6. The cooling system according to claim 2, wherein the second sensor comprises a light integrator, the light integrator having an opening to let at least part of the light not redirected towards the projection optics enter the light integrator and wherein the second sensor measures light integrated by the light integrator.

7. The cooling system according to claim 2, wherein the second sensor comprises a temperature sensor.

8. The cooling system according to claim 1, wherein the measured amount of light absorbed by the light valve is used for gain scheduling, for feedforward control, for adjusting the parameters of a PID controller.

9. The cooling system according to claim 2, wherein a third sensor measures a second temperature at a second part of the light valve and a second active heating, cooling, or heating and cooling device is configured to transfer heat between the second part of light valve and a second heat source, a second heat sink, or a second heat source and sink.

10. The cooling system according to claim 9, wherein the first sensor is placed in the back of the light valve and the third sensor is placed in the front of the light valve.

11. The cooling system according to claim 9, further comprising a second controller for controlling the second active heating, cooling, or heating and cooling device using the measurements of the third sensor and of the determined amount of light absorbed by the light valve in order to control the temperature at the second part of the light valve.

12. The cooling system according to claim 11, wherein the second controller is adapted to reduce the temperature difference between the temperature of the light valve array and of the front temperature around the light valve.

13. The cooling system according to claim 2, wherein the controller is a self-tuning controller and wherein the self-tuning is done in function of at least one measurement made with the second sensor.

14. The cooling system according to claim 2, wherein the controller is an adaptive controller and wherein the adaptive controller is tuned in function of at least one measurement made with the second sensor.

15. The cooling system according to claim 2, wherein the reference temperature is a function of at least one measurement made with the second sensor.

16. The cooling system according to claim 1, wherein the active heating, cooling, or heating and cooling device comprises at least one of a heat sink or metal stud for radiating heat collected at the light valve, and at least one of a fan for cooling said heat sink, or a Peltier element for cooling said heat sink.

17. The cooling system according to claim 16, wherein the metal stud or heat sink is cooled by a liquid circulating through heat exchangers.

18. The cooling system according to claim 16, wherein heat is evacuated from the front side of the light valve by heat pipes, wherein the heat evacuated by a heat pipe is transferred to a liquid coolant by means of a heat exchanger or is transferred to a gas circulated through a finned heat sink, or is transferred to a gas by means of a heat exchanger.

19. The projector comprising the cooling system according to claim 1.

* * * * *